(12) United States Patent
Jiang et al.

(10) Patent No.: US 11,374,722 B2
(45) Date of Patent: Jun. 28, 2022

(54) METHOD AND DEVICE USED IN UE AND BASE STATION FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 96 days.

(21) Appl. No.: 17/010,830

(22) Filed: Sep. 3, 2020

(65) Prior Publication Data

US 2020/0403762 A1 Dec. 24, 2020

Related U.S. Application Data

(63) Continuation of application No. PCT/CN2019/078019, filed on Mar. 13, 2019.

(30) Foreign Application Priority Data

Mar. 22, 2018 (CN) .......................... 201810240672.8

(51) Int. Cl.
*H04L 5/00* (2006.01)
*H04W 74/08* (2009.01)

(52) U.S. Cl.
CPC ............ *H04L 5/0092* (2013.01); *H04L 5/001* (2013.01); *H04L 5/0094* (2013.01); *H04W 74/08* (2013.01); *H04W 74/0808* (2013.01)

(58) Field of Classification Search
CPC ..... H04L 5/0092; H04L 5/0094; H04L 5/001; H04W 74/08
See application file for complete search history.

(56) References Cited

U.S. PATENT DOCUMENTS

2012/0044821 A1\* 2/2012 Kim ...................... H04L 5/0048
455/67.11
2021/0368541 A1\* 11/2021 Hedayat ............ H04W 74/0816

FOREIGN PATENT DOCUMENTS

CN 105208656 A 12/2015
CN 106559202 A 4/2017
(Continued)

OTHER PUBLICATIONS

ISR in application PCT/CN2019/078019 dated May 22, 2019.

*Primary Examiner* — Kevin C. Harper

(57) ABSTRACT

The disclosure provides a method and a device in a User Equipment (UE) and a base station for wireless communication. The UE receives a first signaling in a first time-frequency resource, and receives a first radio signal in a second time-frequency resource; the first signaling is used for indicating K1 target subband(s), the K1 target subband(s) comprise(s) K1 target time-frequency resource(s) respectively, and the second time-frequency resource is one of the K1 target time-frequency resource(s); the first signaling and the first radio signal are both specific to the UE; time domain resources occupied by the first time-frequency resource belong to a first time window. Through the design of the K1 target subband(s), the disclosure guarantees the transmission of important information such as system information and subband indicator signaling on unlicensed spectrum, thereby improving overall performances of the system.

16 Claims, 13 Drawing Sheets

(56) References Cited

FOREIGN PATENT DOCUMENTS

| | | |
|---|---|---|
| CN | 106561066 A | 4/2017 |
| CN | 106603210 A | 4/2017 |
| WO | 2018028625 A1 | 2/2018 |

\* cited by examiner

METHOD AND DEVICE USED IN UE AND BASE STATION FOR WIRELESS COMMUNICATION

CROSS REFERENCE TO RELATED APPLICATIONS

This application is a continuation of International Application No. PCT/CN2019/078019, filed Mar. 13, 2019, claims the priority benefit of Chinese Patent Application No. 201810240672.8, filed on Mar. 22, 2018, the full disclosure of which is incorporated herein by reference.

BACKGROUND

Technical Field

The disclosure relates to transmission methods and devices in wireless communication systems, and in particular to a transmission method and device on unlicensed spectrum.

Related Art

At present, in 5G New Radio Access Technology (NR) Phase 1 systems, in order to support multiple subcarrier spacings in one system bandwidth, considering reasons such as terminal receiving bandwidth limited, a concept of BWP is introduced, that is, when one cell has one Component Carrier (CC) with big bandwidth, a base station can divide the big CC into multiple BWPs so as to adapt to the User Equipment (UE) with small receiving and transmitting bandwidth capabilities; when the UE with small bandwidth capability performs communication with a cell, the UE performs downlink reception or uplink transmission in one BWP only. Meanwhile, in order to improve the flexibility and timeliness of configuration of BWP, the base station can dynamically switch a BWP employing Downlink Control Information (DCI) containing scheduling, and the BWP to dynamically switch to is configured for a terminal through a UE-specific higher-layer signaling.

In future 5G NR Phase 2 and following evolved releases, standalone Licensed Assisted Access (LAA) scenarios will be discussed; however, in standalone LAA, dynamic switch of BWP and corresponding configuration methods need to be designed again.

SUMMARY

At present, in 5G NR systems, a base station configures for each terminal up to four downlink BWPs and up to four uplink BWPs, and triggers switching between the above configured BWPs through physical layer dynamic signalings. The base station configures, for each BWP, a bandwidth, a subcarrier spacing, a frequency domain position, a Cyclic Prefix (CP) type and other configuration information to use for the transmission in the BWP. In standalone-LAA, one typical application scenario is that the base station performs separate energy detections on the multiple BWPs in one system bandwidth and schedules a terminal to an unoccupied BWP among the multiple BWPS to perform data transmission. In view of the above scenarios, there are four problems as follows to resolve.

Problem 1: since the base station does not know which BWP is unoccupied by another transmitting terminal before initiating transmission, the 5G NR based BWP dynamic switch method is no longer applicable.

Problem 2: when the base station finds that multiple BWPs are unoccupied simultaneously, how to evenly distribute multiple UEs onto these unoccupied BWPs to avoid collision and congestion.

Problem 3: due to uncertainty of Listen Before Talk (LBT), the base station needs to notify a UE, through a dynamical signaling, which BWP has scheduling; however, the transmission of the above dynamical signaling itself is restricted to Max Channel Occupy Time (MCOT) and thus cannot be guaranteed.

Problem 4: frequency domain resources occupied by system information and important cell-specific information are uncertain to transmit due to problems of LBT.

In view of the above problems, one simple method is that the dynamic signaling, system information and important cell-specific information are all transmitted in a fixed frequency band so as to ensure that a UE can detect the above information in a fixed frequency domain resource. However, due to uncertainty of LBT, the transmission of the above information may be failed due to LBT failure. In view of the above problems and analysis, the disclosure provides a solution. It should be noted that the embodiments of the UE of the disclosure and the characteristics in the embodiments may be applied to the base station if no conflict is incurred, and vice versa. The embodiments of the disclosure and the characteristics in the embodiments may be mutually combined arbitrarily if no conflict is incurred.

The disclosure provides a method in a UE for wireless communication, wherein the method includes:

receiving a first signaling in a first time-frequency resource; and receiving a first radio signal in a second time-frequency resource.

Herein, the first signaling is used for indicating K1 target subband(s), the K1 target subband(s) include(s) K1 target time-frequency resource(s) respectively, and the second time-frequency resource is one of the K1 target time-frequency resource(s); frequency domain resources occupied by the first time-frequency resource belong to a first subband, and any one of the K1 target subband(s) is orthogonal to the first subband; the first signaling is a physical layer signaling other than the UE-specific physical layer signalings; the first radio signal is a radio signal other than the UE-specific radio signals; time domain resources occupied by the first time-frequency resource are a first time unit, the first time unit belongs to a first time window, and a duration of the first time window in time domain is an MCOT for the first subband; and the K1 is a positive integer.

In one embodiment, the above method has the following benefits: before reaching a maximum time occupying the first subband, that is, before the first time window expires, the base station switches all UEs attached to the first subband to the K1 target subband(s) through the first signaling; moreover, the base station, before initiating the switch, performs a channel detection against the K1 target subband(s) to ensure that the K1 target subband(s) can be occupied, thereby guaranteeing that the downlink transmission of the base station will not be interrupted due to MCOT reaching the maximum time.

In one embodiment, the above method has another following benefit: the K1 target subband(s) may be used by the base station to transmit system information and currently available subbands indicators (for example, the first radio signal); since the above information is cell specific, not UE specific, the above information will not lead to big signaling overheads.

According to one aspect of the disclosure, the above method includes:

receiving a second signaling in a third time-frequency resource.

Herein, the second signaling is used for indicating the first time-frequency resource, and the second signaling is transmitted in the first subband; and time domain resources occupied by the third time-frequency resource belong to the first time window.

In one embodiment, the above method has one benefit as follows: the first time-frequency resource is indicated dynamically through the second signaling, that is, the end time of MCOT is notified to the UE, ensuring that the UE switches to the K1 target subband(s) before the MCOT expires and enabling the downlink transmission of the base station to switch between multiple subbands without interruption, thereby guaranteeing the continuity of overall downlink transmission of the system.

According to one aspect of the disclosure, the above method includes:

receiving a third signaling in a fourth time-frequency resource; and operating a fourth radio signal.

Herein, frequency domain resources occupied by the fourth time-frequency resource belong to a fourth subband, and the fourth subband is one of K2 candidate subband(s); the first radio signal is used for determining the K2 candidate subband(s); the third signaling includes first configuration information, and the first configuration is applicable to the fourth radio signal; the first configuration information includes at least one of occupied frequency domain resources, occupied time domain resources, a Modulation and Coding State (MCS) and a HARQ process number; the operating is receiving or the operating is transmitting; and the K2 is a positive integer.

In one embodiment, the above method has one benefit as follows: the first radio signal dynamically indicates the K2 candidate subband(s), that is, K2 candidate subband(s) used for transmitting UE-specific information; since the first radio signal may be transmitted in all the K1 target subband(s), the transmission of the first radio signal will not be interrupted due to LBT, thereby guaranteeing the reliability of transmission of UE-specific information.

According to one aspect of the disclosure, the above method is characterized in that: a first identifier is the UE specific, and the first identifier is used for determining the fourth subband from the K2 candidate subband(s).

In one embodiment, the above method has one benefit as follows: the UE receives or transmits radio signals in one of the K2 candidate subband(s) only, which simplifies the complexity of the UE and conforms to the restrictions in existing NR that UE operates in one active BWP only.

In one embodiment, the above method has another benefit as follows: through the design of the UE-specific first identifier, different UEs are randomized to different candidate subbands among the K2 candidate subbands, thereby achieving load balance and avoiding collision.

According to one aspect of the disclosure, the above method includes:

receiving first information.

Herein, the first information is used for indicating a first-type subband set, and the first-type subband set includes the first subband and the K1 target subband(s); and the first information is transmitted through an air interface.

In one embodiment, the above method has one benefit as follows: the base station configures a dedicated subband set (that is, the first-type subband set) for downlink information that needs to be transmitted periodically, such as system information, synchronization signals and available BWP indicator information; the base station reduces transmissions of UE-specific radio signals in the first-type subband set so as to increase LBT opportunities, thereby guaranteeing the continuity and stability of the above downlink information that needs to be transmitted periodically.

According to one aspect of the disclosure, the above method includes:

receiving second information.

Herein, the second information is used for indicating a second-type subband set, and the second-type subband set includes the K2 candidate subband(s); and the second information is transmitted through an air interface.

In one embodiment, the above method has one benefit as follows: the base station configures the subbands transmitting UE-specific radio signals and the subbands transmitting important system information separately, which guarantees the robustness of transmission of the important system information.

According to one aspect of the disclosure, the above method includes:

receiving a first-type information group.

Herein, the first-type information group is used for configuring the first subband and a second subband; frequency domain resources occupied by the second time-frequency resource belong to the second subband; and the first-type information group includes at least one of relevant information to a subcarrier spacing, relevant information to a cyclic prefix or relevant information to a bandwidth.

In one subembodiment, the above method has the following benefits: the first-type information group is used for both the first subband and the second subband, when the first subband and the second subband change dynamically in the first-type subband set, the first-type information group changes accordingly; the above design removes the one-to-one correspondence between BWP configuration information and absolute frequency-domain resources, which makes the system design more flexible and efficient, saves signaling overheads, and avoids configuring two information groups for the first subband and the second subband respectively.

The disclosure provides a method in a base station for wireless communication, wherein the method includes:

transmitting a first signaling in a first time-frequency resource; and transmitting a first radio signal in a second time-frequency resource.

Herein, the first signaling is used for indicating K1 target subband(s), the K1 target subband(s) include(s) K1 target time-frequency resource(s) respectively, and the second time-frequency resource is one of the K1 target time-frequency resource(s); frequency domain resources occupied by the first time-frequency resource belong to a first subband, and any one of the K1 target subband(s) is orthogonal to the first subband; a receiver of the first signaling includes a first terminal, and the first signaling is a physical layer signaling other than the first terminal-specific physical layer signalings; the first radio signal is a radio signal other than the first terminal-specific radio signals; time domain resources occupied by the first time-frequency resource are a first time unit, the first time unit belongs to a first time window, and a duration of the first time window in time domain is an MCOT for the first subband; and the K1 is a positive integer.

According to one aspect of the disclosure, the above method includes:

transmitting a second signaling in a third time-frequency resource.

Herein, the second signaling is used for indicating the first time-frequency resource, and the second signaling is transmitted in the first subband; and time domain resources occupied by the third time-frequency resource belong to the first time window.

According to one aspect of the disclosure, the above method includes:

transmitting a third signaling in a fourth time-frequency resource; and processing a fourth radio signal.

Herein, frequency domain resources occupied by the fourth time-frequency resource belong to a fourth subband, and the fourth subband is one of K2 candidate subband(s); the first radio signal is used for determining the K2 candidate subband(s); the third signaling includes first configuration information, and the first configuration is applicable to the fourth radio signal; the first configuration information includes at least one of occupied frequency domain resources, occupied time domain resources, an MCS and a HARQ process number; the processing is transmitting or the processing is receiving; and the K2 is a positive integer.

According to one aspect of the disclosure, the above method is characterized in that: a first identifier is the first terminal specific, and the first identifier is used for determining the fourth subband from the K2 candidate subband(s).

According to one aspect of the disclosure, the above method is characterized in that:

transmitting first information.

Herein, the first information is used for indicating a first-type subband set, and the first-type subband set includes the first subband and the K1 target subband(s); the first information is transmitted through an air interface.

According to one aspect of the disclosure, the above method includes:

performing a first energy detection on K3 first-type subband(s).

The first energy detection is used for determining the K1 target subband(s) from the K3 first-type subband(s), and the first-type subband set includes the K3 first-type subband(s).

In one embodiment, the above method has the following benefits: the base station performs LBT on the K3 first-type subband(s) while performing transmissions in the first subband, so as to switch the UE to the K1 target subband(s) through the first signaling before the MCOT expires.

According to one aspect of the disclosure, the above method includes:

transmitting second information.

Herein, the second information is used for indicating a second-type subband set, and the second-type subband set includes the K2 candidate subband(s); the second information is transmitted through an air interface.

According to one aspect of the disclosure, the above method includes:

performing a second energy detection on K4 second-type subband(s).

Herein, the second energy detection is used for determining the K2 candidate subband(s) from the K4 second-type subband(s), and the second-type subband set includes the K4 second-type subband(s).

According to one aspect of the disclosure, the above method includes:

transmitting a first-type information group.

Herein, the first-type information group is used for configuring the first subband and a second subband; frequency domain resources occupied by the second time-frequency resource belong to the second subband; and the first-type information group includes at least one of relevant information to a subcarrier spacing, relevant information to a cyclic prefix or relevant information to a bandwidth The disclosure provides a UE for wireless communication, wherein the UE includes:

a first receiver, to receive a first signaling in a first time-frequency resource; and a first transceiver, to receive a first radio signal in a second time-frequency resource.

Herein, the first signaling is used for indicating K1 target subband(s), the K1 target subband(s) include(s) K1 target time-frequency resource(s) respectively, and the second time-frequency resource is one of the K1 target time-frequency resource(s); frequency domain resources occupied by the first time-frequency resource belong to a first subband, and any one of the K1 target subband(s) is orthogonal to the first subband; the first signaling is a physical layer signaling other than the UE-specific physical layer signalings; the first radio signal is a radio signal other than the UE-specific radio signals; time domain resources occupied by the first time-frequency resource are a first time unit, the first time unit belongs to a first time window, and a duration of the first time window in time domain is an MCOT for the first subband; and the K1 is a positive integer.

In one embodiment, the above UE for wireless communication is characterized in that: the first receiver receives a second signaling in a third time-frequency resource; the second signaling is used for indicating the first time-frequency resource, and the second signaling is transmitted in the first subband; and time domain resources occupied by the third time-frequency resource belong to the first time window.

In one embodiment, the above UE for wireless communication is characterized in that: the first transceiver receives a third signaling in a fourth time-frequency resource, and the first transceiver receives a fourth radio signal; frequency domain resources occupied by the fourth time-frequency resource belong to a fourth subband, and the fourth subband is one of K2 candidate subband(s); the first radio signal is used for determining the K2 candidate subband(s); the third signaling includes first configuration information, and the first configuration is applicable to the fourth radio signal; the first configuration information includes at least one of occupied frequency domain resources, occupied time domain resources, an MCS and a HARQ process number; the operate is receive or the operate is transmit; and the K2 is a positive integer.

In one embodiment, the above UE for wireless communication is characterized in that: the first transceiver receives a third signaling in a fourth time-frequency resource, and the first transceiver transmits a fourth radio signal; frequency domain resources occupied by the fourth time-frequency resource belong to a fourth subband, and the fourth subband is one of K2 candidate subband(s); the first radio signal is used for determining the K2 candidate subband(s); the third signaling includes first configuration information, and the first configuration is applicable to the fourth radio signal; the first configuration information includes at least one of occupied frequency domain resources, occupied time domain resources, an MCS and a HARQ process number; the operate is receive or the operate is transmit; and the K2 is a positive integer.

In one embodiment, the above UE for wireless communication is characterized in that: a first identifier is the UE specific, and the first identifier is used for determining the fourth subband from the K2 candidate subband(s).

In one embodiment, the above UE for wireless communication is characterized in that: the first receiver also receives first information; the first information is used for indicating a first-type subband set, and the first-type subband set includes the first subband and the K1 target subband(s); and the first information is transmitted through an air interface;

In one embodiment, the above UE for wireless communication is characterized in that: the first receiver also receives second information, the second information is used for indicating a second-type subband set, and the second-type subband set includes the K2 candidate subband(s); and the second information is transmitted through an air interface.

In one embodiment, the above UE for wireless communication is characterized in that: the first receiver also receives a first-type information group; the first-type information group is used for configuring the first subband and a second subband; frequency domain resources occupied by the second time-frequency resource belong to the second subband; and the first-type information group includes at least one of relevant information to a subcarrier spacing, relevant information to a cyclic prefix or relevant information to a bandwidth.

The disclosure provides a base station for wireless communication, wherein the base station includes:

a second transceiver, to transmit a first signaling in a first time-frequency resource; and a third transceiver, to transmit a first radio signal in a second time-frequency resource.

Herein, the first signaling is used for indicating K1 target subband(s), the K1 target subband(s) include(s) K1 target time-frequency resource(s) respectively, and the second time-frequency resource is one of the K1 target time-frequency resource(s); frequency domain resources occupied by the first time-frequency resource belong to a first subband, and any one of the K1 target subband(s) is orthogonal to the first subband; a receiver of the first signaling includes a first terminal, and the first signaling is a physical layer signaling other than the first terminal-specific physical layer signalings; the first radio signal is a radio signal other than the first terminal-specific radio signals; time domain resources occupied by the first time-frequency resource are a first time unit, the first time unit belongs to a first time window, and a duration of the first time window in time domain is an MCOT for the first subband; and the K1 is a positive integer.

In one embodiment, the above base station for wireless communication is characterized in that: the second transceiver also transmits a second signaling in a third time-frequency resource; the second signaling is used for indicating the first time-frequency resource, and the second signaling is transmitted in the first subband; and time domain resources occupied by the third time-frequency resource belong to the first time window.

In one embodiment, the above base station for wireless communication is characterized in that: the third transceiver also transmits a third signaling in a fourth time-frequency resource, and the third transceiver also transmits a fourth radio signal; frequency domain resources occupied by the fourth time-frequency resource belong to a fourth subband, and the fourth subband is one of K2 candidate subband(s); the first radio signal is used for determining the K2 candidate subband(s); the third signaling includes first configuration information, and the first configuration is applicable to the fourth radio signal; the first configuration information includes at least one of occupied frequency domain resources, occupied time domain resources, an MCS and a HARQ process number; the process is transmit or the process is receive; and the K2 is a positive integer.

In one embodiment, the above base station for wireless communication is characterized in that: the third transceiver also transmits a third signaling in a fourth time-frequency resource, and the third transceiver also receives a fourth radio signal; frequency domain resources occupied by the fourth time-frequency resource belong to a fourth subband, and the fourth subband is one of K2 candidate subband(s); the first radio signal is used for determining the K2 candidate subband(s); the third signaling includes first configuration information, and the first configuration is applicable to the fourth radio signal; the first configuration information includes at least one of occupied frequency domain resources, occupied time domain resources, an MCS and a HARQ process number; the process is transmit or the process is receive; and the K2 is a positive integer.

In one embodiment, the above base station for wireless communication is characterized in that: a first identifier is the first terminal specific, and the first identifier is used for determining the fourth subband from the K2 candidate subband(s).

In one embodiment, the above base station for wireless communication is characterized in that: the second transceiver also transmits first information; the first information is used for indicating a first-type subband set, and the first-type subband set includes the first subband and the K1 target subband(s); the first information is transmitted through an air interface.

In one embodiment, the above base station for wireless communication is characterized in that: the second transceiver also performs a first energy detection on K3 first-type subband(s); and the first energy detection is used for determining the K1 target subband(s) from the K3 first-type subband(s), and the first-type subband set includes the K3 first-type subband(s).

In one embodiment, the above base station for wireless communication is characterized in that: the second transceiver also transmits second information; the second information is used for indicating a second-type subband set, and the second-type subband set includes the K2 candidate subband(s); the second information is transmitted through an air interface.

In one embodiment, the above base station for wireless communication is characterized in that: the second transceiver also performs a second energy detection on K4 second-type subband(s); and the second energy detection is used for determining the K2 candidate subband(s) from the K4 second-type subband(s), and the second-type subband set includes the K4 second-type subband(s).

In one embodiment, the above base station for wireless communication is characterized in that: the second transceiver also transmits a first-type information group; the first-type information group is used for configuring the first subband and a second subband; frequency domain resources occupied by the second time-frequency resource belong to the second subband; and the first-type information group includes at least one of relevant information to a subcarrier spacing, relevant information to a cyclic prefix or relevant information to a bandwidth.

In one embodiment, compared with conventional schemes, the disclosure has the following benefits.

Before reaching a maximum time occupying the first subband, that is, before the first time window expires, the base station switches all UEs attached to the first subband to the K1 target subband(s) through the first signaling; moreover, the base station, before initiating the switch, performs a channel detection against the K1 target subband(s) to ensure that the K1 target subband(s) can be occupied, thereby guaranteeing that the downlink transmission of the base station will not be interrupted due to MCOT reaching the maximum time; time-frequency resources occupied by the first signaling are indicated dynamically through the second signaling, enabling the downlink transmission of the base station to switch between multiple subbands without interruption, thereby guaranteeing the continuity of overall downlink transmission of the system.

The K1 target subband(s) may be used by the base station to transmit system information and currently available subbands indicators (for example, the first radio signal); since the above information is cell specific, not UE specific, the above information will not lead to big signaling overheads; moreover, the K1 target subband(s) belong(s) to a particular first-type subband set; the base station reduces transmissions of UE-specific radio signals in the first-type subband set so as to increase LBT opportunities, thereby guaranteeing the continuity and stability of the above downlink information that needs to be transmitted periodically.

The first radio signal dynamically indicates the K2 candidate subband(s), that is, K2 candidate subband(s) used for transmitting UE-specific information; since the first radio signal may be transmitted in all the K1 target subband(s), the transmission of the first radio signal will not be interrupted due to LBT, thereby guaranteeing the reliability of transmission of UE-specific information.

The UE receives or transmits radio signals in one of the K2 candidate subband(s) only, which simplifies the complexity of the UE and conforms to the restrictions in existing NR that UE operates in one active BWP only; through the design of the UE-specific first identifier, different UEs are randomized to different candidate subbands among the K2 candidate subbands, thereby achieving load balance and avoiding collision.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be arbitrarily combined if there is no conflict.

Embodiment 1

Figure 1:
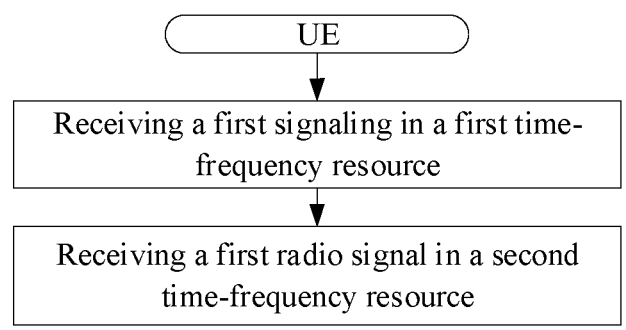
FIG. 1 is a flowchart of a first signaling according to one embodiment of the disclosure.

Embodiment 1 illustrates a flowchart of a first signaling, as shown in FIG. 1.

In Embodiment 1, the UE in the disclosure receives a first signaling in a first time-frequency resource, and receives a first radio signal in a second time-frequency resource; the first signaling is used for indicating K1 target subband(s), the K1 target subband(s) include(s) K1 target time-frequency resource(s) respectively, and the second time-frequency resource is one of the K1 target time-frequency resource(s); frequency domain resources occupied by the first time-frequency resource belong to a first subband, and any one of the K1 target subband(s) is orthogonal to the first subband; the first signaling is a physical layer signaling other than the UE-specific physical layer signalings; the first radio signal is a radio signal other than the UE-specific radio signals; time domain resources occupied by the first time-frequency resource are a first time unit, the first time unit belongs to a first time window, and a duration of the first time window in time domain is an MCOT for the first subband; and the K1 is a positive integer.

In one subembodiment, the K1 is equal to 1.

In one subembodiment, the phrase that the K1 target subband(s) include(s) K1 target time-frequency resource(s) respectively refers that: frequency domain resources occupied by the K1 target subband(s) belong to the K1 target time-frequency resource(s) respectively.

In one subembodiment, any one of the K1 target time-frequency resource(s) is one Control Resource Set (CORESET).

In one subembodiment, any one of the K1 target time-frequency resource(s) occupies a positive integer number of multicarrier symbols in time domain, and any one of the K1 target time-frequency resource(s) occupies the frequency domain resources occupied by a positive integer number of Physical Resource Blocks (PRBs) in frequency domain.

In one subembodiment, any one of the K1 target subband(s) is unlicensed.

In one subembodiment, any one of the K1 target subband(s) is one Bandwidth Part (BWP).

In one subembodiment, any one of the K1 target subband(s) is one Component Carrier (CC).

In one subembodiment, any one of the K1 target subband(s) is one serving cell.

In one subembodiment, the first subband is one BWP.

In one subembodiment, the first subband is one CC.

In one subembodiment, the K1 target subband(s) employ(s) K1 different subcarrier spacing(s) respectively.

In one subembodiment, the first time-frequency resource occupies a positive integer number of multicarrier symbols in time domain, and the first time-frequency resource occupies a positive integer number of subcarriers in frequency domain.

In one subembodiment, the phrase that any one of the K1 target subband(s) is orthogonal to the first subband refers that: no subcarrier belongs to both a given target subband and the first subband, wherein the given target subband is any one of the K1 target subband(s).

In one subembodiment, the phrase that the first signaling is used for indicating K1 target subband(s) refers that: the first signaling is used for indicating the K1 target subband(s) from a first-type subband set, the first-type subband set includes K3 first-type subband(s), the K3 is a positive integer not less than the K1, and the K1 target subband(s) is(are) a subset belonging to the first-type subband set; and the K3 first-type subband(s) is(are) configured through a higher layer signaling.

In one affiliated embodiment of the above subembodiment, the first signaling includes K3 bit(s), and the K3 bit(s) is(are) specific to the K3 first-type subband(s) respectively; a given bit is any one of the K3 bit(s); the given bit, when equal to 1, is used for indicating that a first-type subband specific to the given bit belongs to the K1 target subband(s), and the given bit, when equal to 0, is used for indicating that a first-type subband specific to the given bit does not belong to the K1 target subband(s).

In one affiliated embodiment of the above subembodiment, the K1 is equal to 1, the first signaling include R bit(s), and the R is a minimum positive integer not less than log, (K3).

In one subembodiment, the phrase that the first signaling is used for indicating K1 target subband(s) refers that: the first signaling indicates a first frequency domain resource, and the K1 target subband(s) is(are) composed of all first-type subbands among the K3 first-type subbands that belong to the first frequency domain resource; and the K3 first-type subbands are configured through a higher layer signaling.

In one subembodiment, the K1 target time-frequency resource(s) occupies(occupy) K1 target time unit(s) in time domain respectively, and any one of the K1 target time unit(s) occupies a positive integer number of multicarrier symbols in time domain.

In one affiliated embodiment of the above subembodiment, the K1 target time units are orthogonal in time domain.

In one affiliated embodiment of the above subembodiment, no multicarrier symbol belongs to any two of the K1 target time units simultaneously.

In one subembodiment, the first signaling is one piece of Downlink Control Information (DCI).

In one subembodiment, the first signaling includes a Cyclic Redundancy Check (CRC), and the CRC is scrambled with a first identity.

In one affiliated embodiment of the above subembodiment, the first identity is 16 binary bits.

In one affiliated embodiment of the above subembodiment, the first identity is a Common Control Radio Network Temporary Identifier (CC-RNTI).

In one affiliated embodiment of the above subembodiment, the first identity is a System Information Radio Network Temporary Identifier (SI-RNTI).

In one affiliated embodiment of the above subembodiment, the first identity is fixed.

In one subembodiment, the first signaling is cell specific.

In one subembodiment, the first radio signal is cell specific.

In one subembodiment, the first radio signal is one DCI.

In one subembodiment, the first radio signal includes a CRC, and the CRC is scrambled with a second identity.

In one affiliated embodiment of the above subembodiment, the second identity is 16 binary bits.

In one affiliated embodiment of the above subembodiment, the second identity is a CC-RNTI.

In one affiliated embodiment of the above subembodiment, the second identity is an SI-RNTI.

In one affiliated embodiment of the above subembodiment, the second identity is fixed.

In one subembodiment, the first radio signal includes a synchronization signal.

In one subembodiment, the first radio signal includes a Synchronization Signal Block (SSB).

In one subembodiment, the first radio signal includes Remaining System Information (RMSI).

In one subembodiment, the first time window is one MCOT for the first subband.

In one subembodiment, the first time window includes a positive integer number of consecutive slots in time domain.

In one subembodiment, a transmitter of the first signaling cannot occupy the first subband after the first time window.

In one subembodiment, after the first time window, a transmitter of the first signaling needs to perform a channel detection to determine that the first subband is unoccupied; the channel detection is an LBT, or the channel detection is a Clear Channel Assessment (CCA).

In one subembodiment, an end of the first time unit in time domain is the same as an end of the first time window in time domain.

In one subembodiment, the first time unit belongs to a first-type time unit set, the first-type time unit set includes a positive integer number of first-type time units, and the first time unit is one of the positive integer number of first-type time units; and the positive integer number of first-type time units are periodically distributed in time domain.

In one subembodiment, a duration of the first time unit is one slot in time domain.

In one subembodiment, a duration of the first time unit is M multicarrier symbol(s) in time domain, and the M is a positive integer not greater than 7.

Embodiment 2

Figure 2:
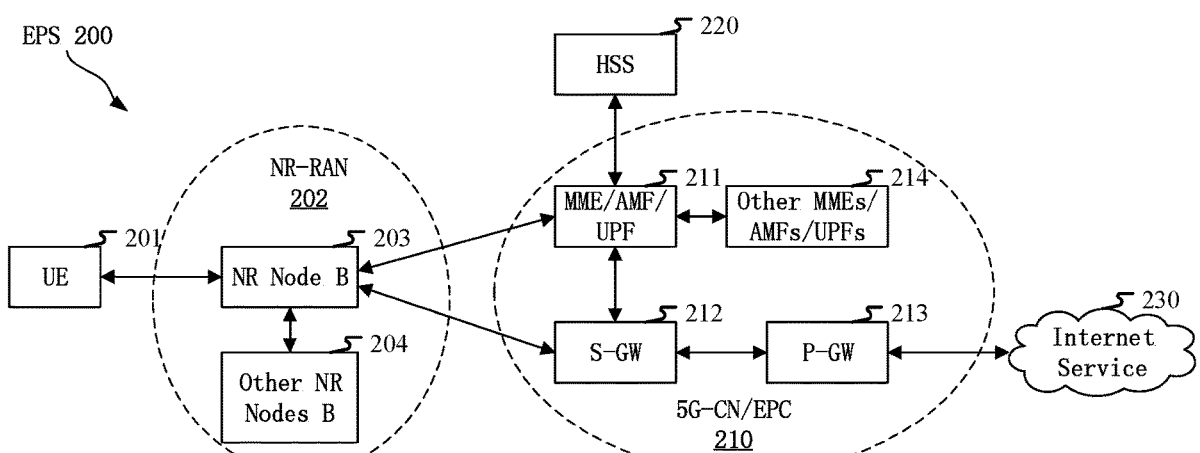
FIG. 2 is a diagram illustrating a network architecture according to one embodiment of the disclosure.

Embodiment 2 illustrates a diagram for a network architecture, as shown in FIG. 2.

Embodiment 2 illustrates a diagram of a network architecture according to the disclosure, as shown in FIG. 2. FIG. 2 is a diagram illustrating a network architecture 200 of NR 5G Long-Term Evolution (LTE) and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, a 5G-Core Network/Evolved Packet Core (5G-CN/EPC) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes a NR node (gNB) 203 and other NR nodes 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), satellite radios, non-territorial network base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, or some other appropriate terms. The gNB 203 is connected to the 5G-CN/EPC 210 via an S1/NG interface. The 5G-CN/EPC 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one subembodiment, the UE 201 corresponds to the UE in the disclosure.

In one subembodiment, the gNB 203 corresponds to the base station in the disclosure.

In one subembodiment, the UE 201 supports wireless communication of data transmission on unlicensed spectrum.

In one subembodiment, the gNB 203 supports wireless communication of data transmission on unlicensed spectrum.

In one subembodiment, the UE 201 supports dynamic switch between multiple BWPs.

In one subembodiment, the gNB 203 supports dynamic switch between multiple BWPs.

In one subembodiment, the UE 201 supports carrier listening based on BWP.

In one subembodiment, the gNB 203 supports carrier listening based on BWP.

Embodiment 3

Figure 3:
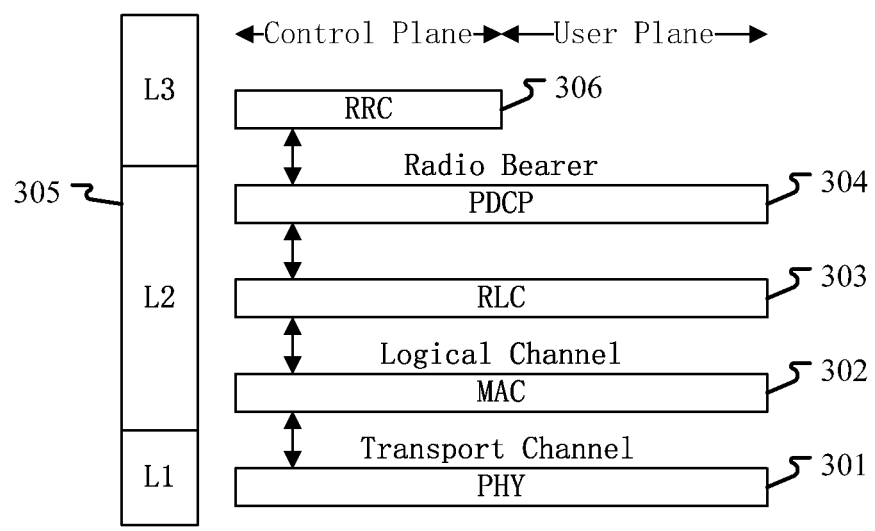
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a base station (gNB or eNB) is illustrated by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown in FIG. 3, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one subembodiment, the radio protocol architecture shown in FIG. 3 is applicable to the UE in the disclosure.

In one subembodiment, the radio protocol architecture shown in FIG. 3 is applicable to the base station in the disclosure.

In one subembodiment, the first signaling in the disclosure is generated on the PHY 301.

In one subembodiment, the first radio signal in the disclosure is generated on the PHY 301.

In one subembodiment, the second signaling in the disclosure is generated on the PHY 301.

In one subembodiment, the third signaling in the disclosure is generated on the PHY 301.

In one subembodiment, the fourth radio signal in the disclosure is generated on the PHY 301.

In one subembodiment, the fourth radio signal in the disclosure is generated on the MAC sublayer 302.

In one subembodiment, the first information in the disclosure is generated on the RRC sublayer 306.

In one subembodiment, the second information in the disclosure is generated on the RRC sublayer 306.

In one subembodiment, the first-type information group in the disclosure is generated on the RRC sublayer 306.

Embodiment 4

Figure 4:
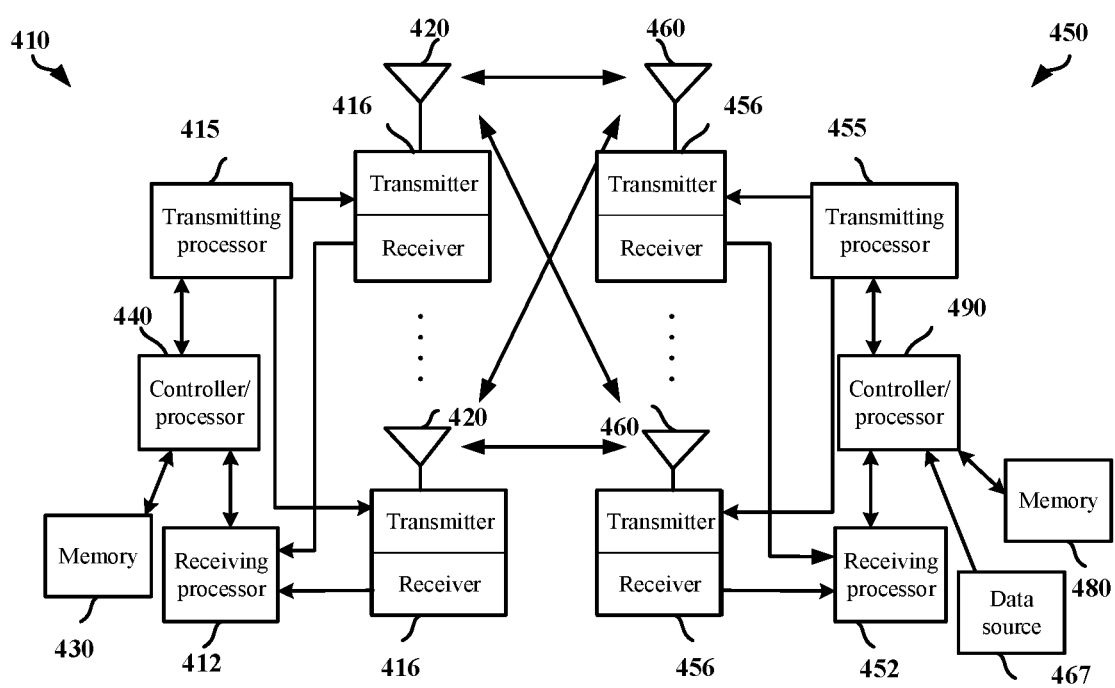
FIG. 4 is a diagram illustrating an evolved node B and a UE according to one embodiment of the disclosure.

Embodiment 4 illustrates a diagram of a base station and a UE according to the disclosure, as shown in FIG. 4. FIG. 4 is a block diagram of a gNB 410 in communication with a UE 450 in an access network.

The base station 410 includes a controller/processor 440, a memory 430, a receiving processor 412, a transmitting processor 415, a transmitter/receiver 416 and an antenna 420.

The UE 450 includes a controller/processor 490, a memory 480, a data source 467, a transmitting processor 455, a receiving processor 452, a transmitter/receiver 456 and an antenna 460.

In UL transmission, processes relevant to the base station 410 include the following.

The receiver 416 receives a radio-frequency signal received via the corresponding antenna 420, converts the received radio-frequency signal into a baseband signal and provides the baseband signal to the receiving processor 412.

The receiving processor 412 performs various signal receiving processing functions of an L1 layer (that is, PHY), including decoding, de-interleaving, descrambling, demodulation, extraction of physical layer control signaling, etc.

The receiving processor 412 performs various signal receiving processing functions of an L1 layer (that is, PHY), including multiantenna receiving, despreading, code division multiplexing, precoding, etc.

The controller/processor 440 performs functions of L2 layer, and is connected to the memory 430 that stores program code and data.

The controller/processor 440 provides de-multiplexing between a logical channel and a transport channel, packet reassembling, decryption, header decompression and control signaling processing to recover a higher-layer packet coming from the UE 450. The higher-layer packet coming from the controller/processor 440 may be provided to the core network.

In Uplink (UL) transmission, processes relevant to the UE 450 include the following.

The data source 467 provides a higher-layer packet to the controller/processor 490. The data source 467 represents all protocol layers above L2 layer.

The transmitter 456 transmits a radio-frequency signal via the corresponding antenna 460, converts a baseband signal into a radio-frequency signal and provides the radio-frequency radio to the corresponding antenna 460.

The transmitting processor 455 performs various signal transmitting processing functions of an L1 layer (that is, PHY), including encoding, interleaving, scrambling, modulation and generation of physical layer control signalings, etc.

The transmitting processor 455 performs various signal transmitting processing functions of an L1 layer (that is, PHY), including multiantenna transmitting, spreading, code division multiplexing, precoding, etc.

The controller/processor 490 provides header compression, encryption, packet segmentation and reordering, multiplexing between a logical channel and a transport channel based on radio resource allocation of the gNB 410, to implement the L2 functions used for the user plane and the control plane.

The controller/processor 459 is also in charge of HARQ operation, retransmission of lost packets, and signalings to the gNB 410.

In Downlink (DL) transmission, processes relevant to the base station 410 include the following.

A higher-layer packet is provided to the controller/processor 440. The controller/processor 440 provides header compression, encryption, packet segmentation and reordering, multiplexing and de-multiplexing between a logical channel and a transport channel, to implement L2 protocols used for the user plane and the control plane. The higher-layer packet may include data or control information, for example, Downlink Shared Channel (DL-SCH).

The controller/processor 440 is connected to the memory 430 that stores program codes and data. The memory 430 may be a computer readable medium.

The controller/processor 440 includes a scheduling unit for transmission requirements, and the scheduling unit is configured to schedule air interface resources corresponding to transmission requirements.

The transmitting processor 415 receives a bit stream output from the controller/processor 440, and performs various signal transmitting processing functions of L1 layer (that is, PHY), including encoding, interleaving, scrambling, modulation, power control/allocation, generation of physical layer control signalings (including PBCH, PDCCH, PHICH, PCFICH, reference signal), etc.

The transmitting processor 415 receives a bit stream output from the controller/processor 440, and performs various signal transmitting processing functions of L1 layer (that is, PHY), including multiantenna transmitting, spreading, code division multiplexing, precoding, etc.

The transmitter 416 is configured to convert the baseband signal provided by the transmitting processor 441 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In Downlink (DL) transmission, processes relevant to the UE 450 include the following.

The receiver 456 is configured to convert a radio-frequency signal received via the antenna 460 into a baseband signal and provide the baseband signal to receiving processor 452.

The receiving processor 452 performs various signal receiving processing functions of an L1 layer (that is, PHY), including decoding, de-interleaving, descrambling, demodulation, extraction of physical layer control signaling, etc.

The receiving processor 452 performs various signal receiving processing functions of an L1 layer (that is, PHY), including multiantenna receiving, despreading, code division multiplexing, precoding, etc.

The controller/processor 490 receives a bit stream output from the receiving processor 452, and provides header decompression, decryption, packet segmentation and reordering, multiplexing and de-multiplexing between a logical channel and a transport channel, to implement L2 protocols used for the user plane and the control plane.

The controller/processor 490 is connected to the memory 480 that stores program codes and data. The memory 480 may be a computer readable medium.

In one subembodiment, the UE 450 includes at least one processor and at least one memory. The at least one memory includes computer program codes. The at least one memory and the computer program codes are configured to be used in collaboration with the at least one processor. The UE 450 at least receives a first signaling in a first time-frequency resource and receives a first radio signal in a second time-frequency resource; the first signaling is used for indicating K1 target subband(s), the K1 target subband(s) include(s) K1 target time-frequency resource(s) respectively, and the second time-frequency resource is one of the K1 target time-frequency resource(s); frequency domain resources occupied by the first time-frequency resource belong to a first subband, and any one of the K1 target subband(s) is orthogonal to the first subband; the first signaling is a physical layer signaling other than the UE-specific physical layer signalings; the first radio signal is a radio signal other than the UE-specific radio signals; time domain resources occupied by the first time-frequency resource are a first time unit, the first time unit belongs to a first time window, and a duration of the first time window in time domain is a Max Channel Occupy Time (MCOT) for the first subband; and the K1 is a positive integer.

In one subembodiment, the UE 450 includes a memory that stores a computer readable instruction program. The computer readable instruction program generates an action when executed by at least one processor. The action includes: receiving a first signaling in a first time-frequency resource and receiving a first radio signal in a second time-frequency resource; the first signaling is used for indicating K1 target subband(s), the K1 target subband(s) include(s) K1 target time-frequency resource(s) respectively, and the second time-frequency resource is one of the K1 target time-frequency resource(s); frequency domain resources occupied by the first time-frequency resource belong to a first subband, and any one of the K1 target subband(s) is orthogonal to the first subband; the first signaling is a physical layer signaling other than the UE-specific physical layer signalings; the first radio signal is a radio signal other than the UE-specific radio signals; time domain resources occupied by the first time-frequency resource are a first time unit, the first time unit belongs to a first time window, and a duration of the first time window in time domain is a Max Channel Occupy Time (MCOT) for the first subband; and the K1 is a positive integer.

In one subembodiment, the gNB 410 device includes at least one processor and at least one memory. The at least one memory includes computer program codes. The at least one memory and the computer program codes are configured to be used in collaboration with the at least one processor. The gNB 410 at least transmits a first signaling in a first time-frequency resource, and transmits a first radio signal in a second time-frequency resource; the first signaling is used for indicating K1 target subband(s), the K1 target subband(s) include(s) K1 target time-frequency resource(s) respectively, and the second time-frequency resource is one of the K1 target time-frequency resource(s); frequency domain resources occupied by the first time-frequency resource belong to a first subband, and any one of the K1 target subband(s) is orthogonal to the first subband; a receiver of the first signaling includes a first terminal, and the first signaling is a physical layer signaling other than the first terminal-specific physical layer signalings; the first radio signal is a radio signal other than the first terminal-specific radio signals; time domain resources occupied by the first time-frequency resource are a first time unit, the first time unit belongs to a first time window, and a duration of the first time window in time domain is an MCOT for the first subband; and the K1 is a positive integer.

In one subembodiment, the gNB 410 includes a memory that stores a computer readable instruction program. The computer readable instruction program generates an action when executed by at least one processor. The action includes transmitting a first signaling in a first time-frequency resource, and transmitting a first radio signal in a second time-frequency resource; the first signaling is used for indicating K1 target subband(s), the K1 target subband(s) include(s) K1 target time-frequency resource(s) respectively, and the second time-frequency resource is one of the K1 target time-frequency resource(s); frequency domain resources occupied by the first time-frequency resource belong to a first subband, and any one of the K1 target subband(s) is orthogonal to the first subband; a receiver of the first signaling includes a first terminal, and the first signaling is a physical layer signaling other than the first terminal-specific physical layer signalings; the first radio signal is a radio signal other than the first terminal-specific radio signals; time domain resources occupied by the first time-frequency resource are a first time unit, the first time unit belongs to a first time window, and a duration of the first time window in time domain is an MCOT for the first subband; and the K1 is a positive integer.

In one subembodiment, the UE 450 corresponds to the UE in the disclosure.

In one subembodiment, the gNB 410 corresponds to the base station in the disclosure.

In one subembodiment, at least the former two of the receiver 456, the receiving processor 452 and the controller/processor 490 are used for receiving a first signaling in a first time-frequency resource.

In one subembodiment, at least the former two of the receiver 456, the receiving processor 452 and the controller/processor 490 are used for receiving a first radio signal in a second time-frequency resource.

In one subembodiment, at least the former two of the receiver 456, the receiving processor 452 and the controller/processor 490 are used for receiving a second signaling in a third time-frequency resource.

In one subembodiment, at least the former two of the receiver 456, the receiving processor 452 and the controller/processor 490 are used for receiving a third signaling in a fourth time-frequency resource.

In one subembodiment, at least the former two of the receiver 456, the receiving processor 452 and the controller/processor 490 are used for receiving a fourth radio signal.

In one subembodiment, at least the former two of the transmitter 456, the transmitting processor 455 and the controller/processor 490 are used for transmitting a fourth radio signal.

In one subembodiment, at least the former two of the receiver 456, the receiving processor 452 and the controller/processor 490 are used for receiving first information.

In one subembodiment, at least the former two of the receiver 456, the receiving processor 452 and the controller/processor 490 are used for receiving second information.

In one subembodiment, at least the former two of the receiver 456, the receiving processor 452 and the controller/processor 490 are used for receiving a first-type information group.

In one subembodiment, at least the former two of the transmitter 416, the transmitting processor 415 and the controller/processor 440 are used for transmitting a first signaling in a first time-frequency resource.

In one subembodiment, at least the former two of the transmitter 416, the transmitting processor 415 and the controller/processor 440 are used for transmitting a first radio signal in a second time-frequency resource.

In one subembodiment, at least the former two of the transmitter 416, the transmitting processor 415 and the controller/processor 440 are used for transmitting a second signaling in a third time-frequency resource.

In one subembodiment, at least the former two of the transmitter 416, the transmitting processor 415 and the controller/processor 440 are used for transmitting a third signaling in a fourth time-frequency resource.

In one subembodiment, at least the former two of the transmitter 416, the transmitting processor 415 and the controller/processor 440 are used for transmitting a fourth radio signal.

In one subembodiment, at least the former two of the receiver 416, the receiving processor 412 and the controller/processor 440 are used for receiving a fourth radio signal.

In one subembodiment, at least the former two of the transmitter 416, the transmitting processor 415 and the controller/processor 440 are used for transmitting first information.

In one subembodiment, at least the former two of the receiver 416, the receiving processor 412 and the controller/processor 440 are used for performing a first energy detection on K3 first-type subband(s).

In one subembodiment, at least the former two of the transmitter 416, the transmitting processor 415 and the controller/processor 440 are used for transmitting second information.

In one subembodiment, at least the former two of the receiver 416, the receiving processor 412 and the controller/processor 440 are used for performing a second energy detection on K4 second-type subband(s).

In one subembodiment, at least the former two of the transmitter 416, the transmitting processor 415 and the controller/processor 440 are used for transmitting a first-type information group.

Embodiment 5

Figure 5:
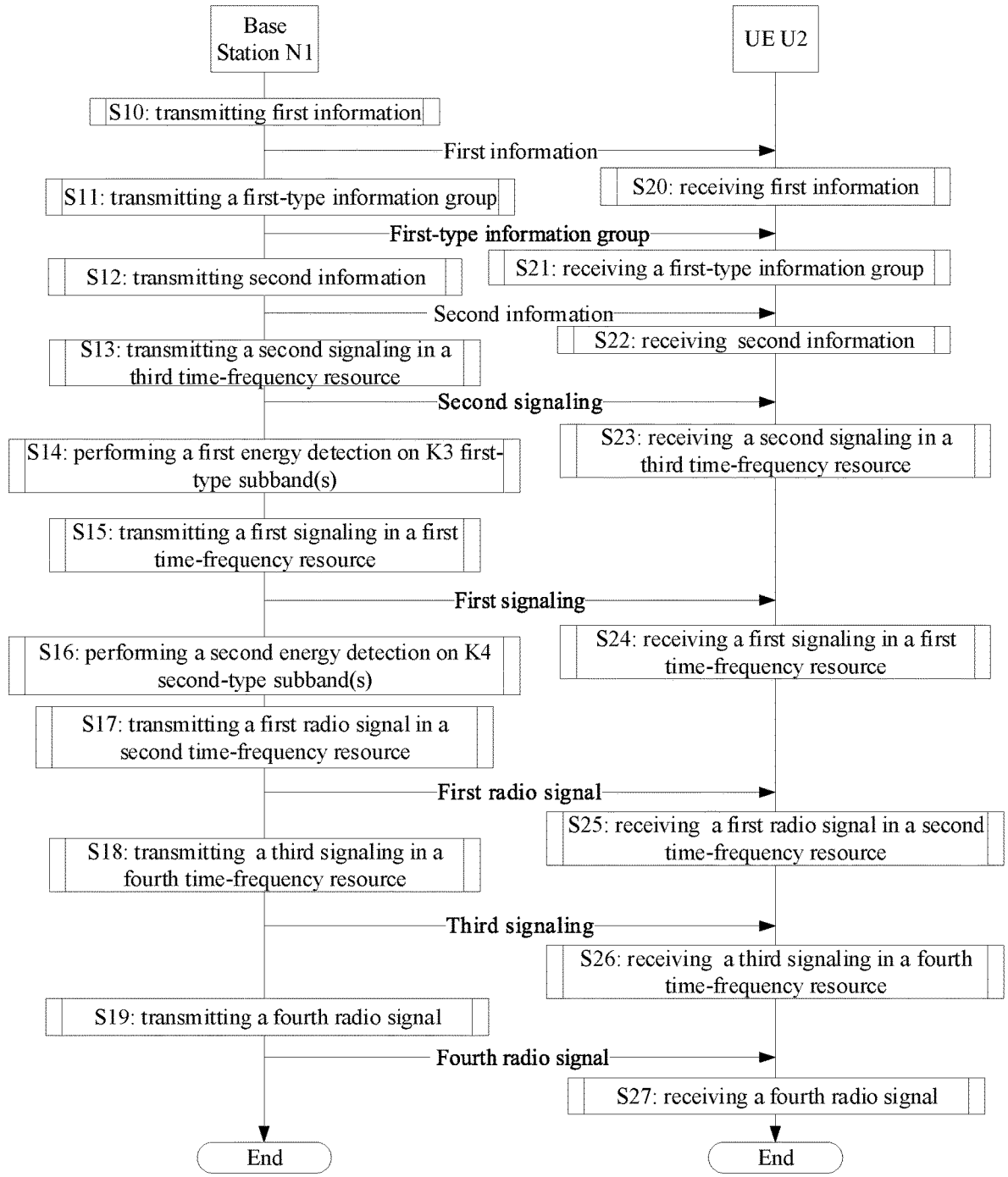
FIG. 5 is a flowchart of a first radio signal according to one embodiment of the disclosure.

Embodiment 5 illustrates a flowchart of a first radio signal, as shown in FIG. 5. In FIG. 5, a base station N1 is a maintenance base station for a serving cell of a UE U2. In FIGS. 5, S19 and S27 illustrated in Embodiment 5 may be replaced by S30 and S40 illustrated in Embodiment 6 respectively if no conflict is incurred.

The base station N1 transmits first information in S10, transmits a first-type information group in S11, transmits second information in S12, transmits a second signaling in a third time-frequency resource in S13, performs a first energy detection on K3 first-type subband(s) in S14, transmits a first signaling in a first time-frequency resource in S15, performs a second energy detection on K4 second-type subband(s) in S16, transmits a first radio signal in a second time-frequency resource in S17, transmits a third signaling in a fourth time-frequency resource in S18, and transmits a fourth radio signal in S19.

The UE U2 receives first information in S20, receives a first-type information group in S21, receives second information in S22, receives a second signaling in a third time-frequency resource in S23, receives a first signaling in a first time-frequency resource in S24, receives a first radio signal in a second time-frequency resource in S25, receives a third signaling in a fourth time-frequency resource in S26, and receives a fourth radio signal in S27.

In Embodiment 5, the first signaling is used for indicating K1 target subband(s), the K1 target subband(s) include(s) K1 target time-frequency resource(s) respectively, and the second time-frequency resource is one of the K1 target time-frequency resource(s); frequency domain resources occupied by the first time-frequency resource belong to a first subband, and any one of the K1 target subband(s) is orthogonal to the first subband; the first signaling is a physical layer signaling other than the UE U2-specific physical layer signalings; the first radio signal is a radio signal other than the UE U2-specific radio signals; time domain resources occupied by the first time-frequency resource are a first time unit, the first time unit belongs to a first time window, and a duration of the first time window in time domain is an MCOT for the first subband; the K1 is a positive integer; the second signaling is used for indicating the first time-frequency resource, and the second signaling is transmitted in the first subband; and time domain resources occupied by the third time-frequency resource belong to the first time window; frequency domain resources occupied by the fourth time-frequency resource belong to a fourth subband, and the fourth subband is one of K2 candidate subband(s); the first radio signal is used for determining the K2 candidate subband(s); the third signaling includes first configuration information, and the first configuration is applicable to the fourth radio signal; the first configuration information includes at least one of occupied frequency domain resources, occupied time domain resources, an MCS and a HARQ process number; the K2 is a positive integer; a first identifier is the UE U2 specific, and the first identifier is used for determining the fourth subband from the K2 candidate subband(s); the first information is used for indicating a first-type subband set, and the first-type subband set includes the first subband and the K1 target subband(s); the first information is transmitted through an air interface; the second information is used for indicating a second-type subband set, and the second-type subband set includes the K2 candidate subband(s); the second information is transmitted through an air interface; the first-type information group is used for configuring the first subband and a second subband; frequency domain resources occupied by the second time-frequency resource belong to the second subband; and the first-type information group includes at least one of relevant information to a subcarrier spacing, relevant information to a cyclic prefix or relevant information to a bandwidth.

In one subembodiment, the third time-frequency resource is one CORESET.

In one subembodiment, the second signaling is one DCI.

In one subembodiment, the second signaling is a physical layer signaling other than the UE U2-specific physical layer signalings.

In one subembodiment, the second signaling includes a CRC, and the CRC is scrambled with a third identity.

In one affiliated embodiment of the above subembodiment, the third identity is 16 binary bits.

In one affiliated embodiment of the above subembodiment, the third identity is a CC-RNTI.

In one subembodiment, the second signaling is the UE U2 specific, and the second signaling further includes a grant for the UE U2.

In one subembodiment, the K2 is equal to 1, or the K2 is greater than 1.

In one subembodiment, the third signaling is the UE U2-specific physical layer signaling.

In one subembodiment, the third signaling is a DL grant, and the fourth radio signal includes a PDSCH.

In one subembodiment, the third signaling includes a CRC, and the CRC is scrambled with the UE U2-specific C-RNTI.

In one subembodiment, the fourth time-frequency resource is one CORESET.

In one subembodiment, the phrase that the first radio signal is used for determining the K2 candidate subband(s) refers that: the first radio signal is used for indicating the K2 candidate subband(s) from the second-type subband set, the second-type subband set includes K4 second-type subband(s), the K4 is a positive integer not less than the K2, and the K2 candidate subband(s) is(are) a subset belonging to the second-type subband set.

In one affiliated embodiment of the above subembodiment, the first radio signal includes K4 bit(s), the K4 bit(s) is(are) specific to the K4 second-type subband(s) respectively; a given bit is any one of the K4 bit(s); the given bit, when equal to 1, is used for indicating that a second-type subband corresponding to the given bit belongs to the K2 candidate subband(s); and the given bit, when equal to 0, is used for indicating that a second-type subband corresponding to the given bit does not belong to the K2 candidate subband(s).

In one subembodiment, the phrase that the first radio signal is used for determining the K2 candidate subband(s) refers that: the first radio signal indicates a second frequency domain resource, and the K2 candidate subband(s) is(are) composed of all second-type subbands among the K4 second-type subbands that belong to the second frequency domain resource; and the K4 second-type subbands all belong to the second-type subband set, and the second-type subband set is configured through a higher layer signaling.

In one subembodiment, the first identifier is a C-RNTI employed by the UE U2.

In one subembodiment, the first identifier is a UE ID of the UE U2.

In one subembodiment, the first identifier is an International Mobile Subscriber Identification Number (IMSI) of the UE U2.

In one subembodiment, the first identifier is an SAE Temporary Mobile Subscriber Identity (S-TMSI) of the UE U2, wherein the SAE represents System Architecture Evolution.

In one subembodiment, the phrase that the first identifier is used for determining the fourth subband from the K2 candidate subband(s) refers that: the first identifier is equal to L, the L is a non-negative integer, a remainder of the L modulo the K2 is equal to L1, and the fourth subband is the (L1+1)th candidate subband among the K2 candidate subband(s).

In one affiliated embodiment of the above subembodiment, the K2 candidate subbands are a candidate subband #0 to a candidate subband #(K2−1), and the (L1+1)th candidate subband is the candidate subband #(L1).

In one affiliated embodiment of the above subembodiment, the K2 candidate subbands are sequentially arranged as a candidate subband #0 to a candidate subband #(K2−1) in an order from low to high according to center frequency points.

In one affiliated embodiment of the above subembodiment, the K2 candidate subbands are sequentially arranged as a candidate subband #0 to a candidate subband #(K2−1) in an order from low to high according to frequency points of lowest subcarriers.

In one affiliated embodiment of the above subembodiment, the K2 candidate subbands are sequentially arranged as a candidate subband #0 to a candidate subband #(K2−1) in an order from low to high according to frequency points of highest subcarriers.

In one affiliated embodiment of the above subembodiment, the K2 candidate subbands are sequentially arranged as a candidate subband #0 to a candidate subband #(K2−1) in an order appearing in the K4 second-type subbands in the disclosure.

In one subembodiment, the first information is transmitted through a cell-specific RRC signaling.

In one subembodiment, the first-type subband set includes K3 first-type subbands, and any two of the K3 first-type subbands are not continuous in frequency domain.

In one subembodiment, the first-type subband set is used for transmitting at least one of synchronization signals and system information.

In one subembodiment, the first-type subband set is used for transmitting radio signals other than UE U2-specific radio signals.

In one subembodiment, the first-type subband set in the disclosure and the second-type subband set in the disclosure form a third-type subband set, the third-type subband set includes K5 third-type subbands, and the K5 is a positive integer greater than a summation of the (K3+K4) in the disclosure.

In one affiliated embodiment of the above subembodiment, any one of the K5 third-type subbands is one BWP.

In one affiliated embodiment of the above subembodiment, any one of the K5 third-type subbands is one CC.

In one affiliated embodiment of the above subembodiment, the K5 third-type subbands are all frequency domain resources on unlicensed spectrum that the base station N1 in the disclosure can use.

In one subembodiment, the second-type subband set is used for transmitting the UE U2-specific radio signals.

In one affiliated embodiment of the above subembodiment, the UE U2-specific radio signals include the UE U2-specific Physical Downlink Control Channel (PDCCH).

In one affiliated embodiment of the above subembodiment, the UE U2-specific radio signals include the UE U2-specific Physical Downlink Shared Channel (PDSCH).

In one affiliated embodiment of the above subembodiment, the UE U2-specific radio signals include the UE U2-specific Physical Uplink Shared Channel (PUSCH).

In one subembodiment, any one of the K2 candidate subbands is one BWP.

In one subembodiment, any one of the K2 candidate subbands is one CC.

In one subembodiment, the second information is transmitted through the UE U2-specific RRC signaling.

In one subembodiment, the first subband and the second subband employ a same transmitting timing.

In one subembodiment, all or partial large-scale properties of radio signals transmitted in the second subband can be determined through large-scale properties of radio signals transmitted in the first subband; and the large-scale properties include one or more of Delay Spread, Doppler Spread, Doppler Shift, Path Loss or Average Gain.

In one subembodiment, the first-type information group includes a given BWP identifier, and the given BWP identifier is the first identifier in the disclosure.

In one subembodiment, the first-type information group includes one BWP identifier only, and the BWP identifier is employed by both the first subband and the second subband.

In one subembodiment, the relevant information to a subcarrier spacing indicates a subcarrier gap or subcarrier spacing of a multicarrier symbol transmitted in the first subband and the second subband.

In one subembodiment, the multicarrier symbol in the disclosure is one of an Orthogonal Frequency Division Multiplexing (OFDM) symbol, a Single-Carrier Frequency Division Multiple Access (SC-FDMA) symbol, a Filter Bank Multi Carrier (FBMC), an OFDM symbol including a Cyclic Prefix (CP), a Discrete Fourier Transform Spreading Orthogonal Frequency Division Multiplexing (DFT-s-OFDM) symbol including a CP.

In one subembodiment, the relevant information to a subcarrier spacing indicates one of 15 kHz, 30 kHz, 60 kHz, 120 kHz, 240 kHz, 480 kHz.

In one subembodiment, the relevant information to a CP indicates one candidate time length from P1 candidate time lengths, and the P1 is a positive integer greater than 1.

In one affiliated embodiment of the above subembodiment, the P1 is 2.

In one subembodiment, the relevant information to a CP indicates one CP type from P2 candidate CP types, and the P2 is a positive integer greater than 1.

In one affiliated embodiment of the above subembodiment, the P2 candidate CP types include a normal CP and an extended CP.

In one affiliated embodiment of the above subembodiment, the P2 is 2.

In one subembodiment, the relevant information to a bandwidth indicates a given candidate bandwidth from P3 candidate bandwidths, and the P3 is a positive integer greater than 1.

In one affiliated embodiment of the above subembodiment, the given candidate bandwidth is employed by the first subband.

In one affiliated embodiment of the above subembodiment, the given candidate bandwidth is employed by the second subband.

In one affiliated embodiment of the above subembodiment, the P3 candidate bandwidths include at least one of 1.44 M, 5 M, 10 M, 15 M, 20 M, 50 M, 100 M or 200 M.

In one affiliated embodiment of the above subembodiment, any one of the P3 candidate bandwidths includes a positive integer number of consecutive PRBs in frequency domain.

In one affiliated embodiment of the above subembodiment, the P3 candidate bandwidths at least include a first candidate bandwidth and a second candidate bandwidth, the first candidate bandwidth includes R1 consecutive PRBs in frequency domain, the second candidate bandwidth includes R2 consecutive PRBs in frequency domain, the R1 and the R2 are both positive integers, and the R is not equal to the R2.

In one subembodiment, the first-type information group includes configuration information relevant to a PDCCH.

In one affiliated embodiment of the above subembodiment, the configuration information relevant to a PDCCH includes a PDCCH-Config Information Element (IE) in 3GPP Technical Specification (TS) 38.331.

In one affiliated embodiment of the above subembodiment, the configuration information relevant to a PDCCH includes a ControlResourceSet in 3GPP TS 38.331.

In one subembodiment, the first-type information group includes configuration information relevant to a PDSCH.

In one affiliated embodiment of the above subembodiment, the configuration information relevant to a PDSCH includes a PDSCH-Config in 3GPP TS 38.331.

In one affiliated embodiment of the above subembodiment, the configuration information relevant to a PDSCH includes a rateMatchResourcesPDSCH in 3GPP TS 38.331.

In one affiliated embodiment of the above subembodiment, the configuration information relevant to a PDSCH includes a Resource-set-group-1 or Resource-set-group-2 in 3GPP TS 38.331.

In one subembodiment, the first-type information group includes configuration information relevant to a Phase Tracking Reference Signal (PTRS).

In one affiliated embodiment of the above subembodiment, the configuration information relevant to a PTRS includes a Downlink-PTRS-Config in TS 38.331.

In one affiliated embodiment of the above subembodiment, the configuration information relevant to a PTRS includes an Uplink-PTRS-Config in TS 38.331.

In one subembodiment, the first-type information group includes configuration information relevant to a Channel State Information Reference Signal (CRS-RS).

In one affiliated embodiment of the above subembodiment, the configuration information relevant to a CRS-RS includes a CSI-ResourceConfig in 3GPP TS 38.331.

In one subembodiment, the first-type information group includes configuration information relevant to a Sounding Reference Signal (SRS).

In one affiliated embodiment of the above subembodiment, the configuration information relevant to an SRS includes an SRS-Config in 3GPP TS 38.331.

In one affiliated embodiment of the above subembodiment, the configuration information relevant to an SRS includes an SRS-ResourceSet in 3GPP TS 38.331.

In one affiliated embodiment of the above subembodiment, the configuration information relevant to an SRS includes an SRS-Resource in 3GPP TS 38.331.

In one subembodiment, the first-type information group includes configuration information relevant to Semi-Persistent Scheduling (SPS).

In one affiliated embodiment of the above subembodiment, the configuration information relevant to SPS includes an SPS-Config in 3GPP TS 38.331.

In one subembodiment, the first-type subband set includes K3 first-type subband(s), and the first-type information group is used for configuring any one of the K3 first-type subband(s).

In one subembodiment, the first signaling is used by the base station N1 to indicate that it will stop transmitting or receiving radio signals in the first subband.

In one subembodiment, the base station transmits K1 first-type signaling(s) in the K1 target time-frequency resource(s) respectively, and the first signaling is one of the K1 first-type signaling(s).

In one affiliated embodiment of the above subembodiment, the K1 first-type signaling(s) is(are) transmitted employing K1 first-type Tx parameter group(s) respectively.

In one example of the above affiliated embodiment, any one of the K1 first-type Tx parameter group(s) includes one or more of a transmitting antenna port, a transmitting antenna port group, a transmitting beam, a transmitting analog beamforming matrix, a transmitting analog beamforming vector, a transmitting beamforming vector or transmitting spatial filtering.

In one subembodiment, the first energy detection includes K3 first energy sub-detection(s), and the K3 first energy sub-detection(s) is(are) specific to the K3 first-type subband(s) respectively.

In one affiliated embodiment of the above subembodiment, any one of the K3 first energy sub-detection(s) is an LBT process.

In one affiliated embodiment of the above subembodiment, any one of the K3 first energy sub-detection(s) is a CCA process.

In one subembodiment, the first energy detection is performed on all the K3 first-type subband(s).

In one affiliated embodiment of the above subembodiment, the first energy detection is an LBT process for frequency domain resources occupied by the K3 first-type subband(s).

In one affiliated embodiment of the above subembodiment, the first energy detection is a CCA process for frequency domain resources occupied by the K3 first-type subband(s).

In one subembodiment, the base station determines that the K1 target subband(s) is(are) unoccupied through the first energy detection.

In one subembodiment, the second energy detection includes K4 second energy sub-detection(s), and the K4 second energy sub-detection(s) is(are) specific to the K4 second-type subband(s) respectively.

In one affiliated embodiment of the above subembodiment, any one of the K4 second energy sub-detection(s) is an LBT process.

In one affiliated embodiment of the above subembodiment, any one of the K4 second energy sub-detection(s) is a CCA process.

In one subembodiment, the second energy detection is performed on all the K4 second-type subband(s).

In one affiliated embodiment of the above subembodiment, the second energy detection is an LBT process for frequency domain resources occupied by the K4 second-type subband(s).

In one affiliated embodiment of the above subembodiment, the second energy detection is a CCA process for frequency domain resources occupied by the K4 second-type subband(s).

In one subembodiment, the base station determines that the K2 candidate subband(s) is(are) unoccupied through the second energy detection.

In one subembodiment, the air interface in the disclosure corresponds to the interface between the UE 201 and the NR node illustrated in Embodiment 2.

In one subembodiment, the air interface in the disclosure is carried through a wireless channel.

In one subembodiment, the antenna port group in the disclosure includes Q antenna port(s), and the Q is a positive integer.

In one affiliated embodiment of the above subembodiment, the Q is equal to 1.

Embodiment 6

Figure 6:
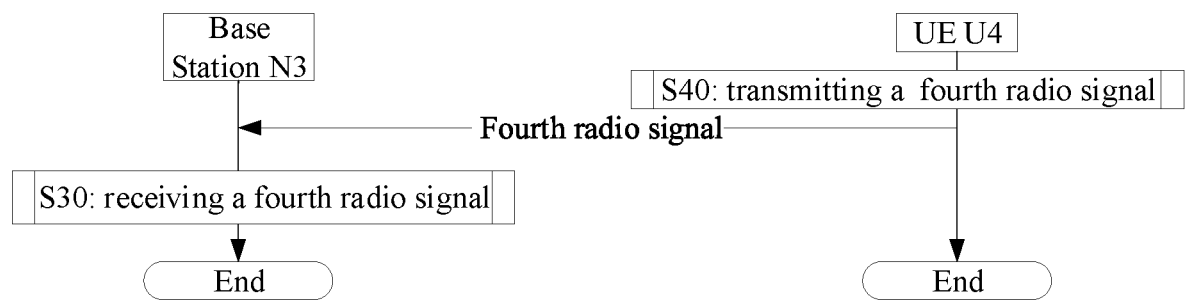
FIG. 6 is a flowchart of a fourth radio signal according to one embodiment of the disclosure.

Embodiment 6 illustrates a flowchart of a fourth radio signal, as shown in FIG. 6. In FIG. 6, a base station N3 is a maintenance base station for a serving cell of a UE U4.

The base station N3 receives a fourth radio signal in S30.
The UE U4 transmits a fourth radio signal in S40.

In Embodiment 6, S30 can replace S19 illustrated in Embodiment 5, and S40 can replace S27 illustrated in Embodiment 5.

In one subembodiment, the third signaling is a UL grant, and the fourth radio signal includes a Physical Uplink Shared Channel (PUSCH).

Embodiment 7

Figure 7:
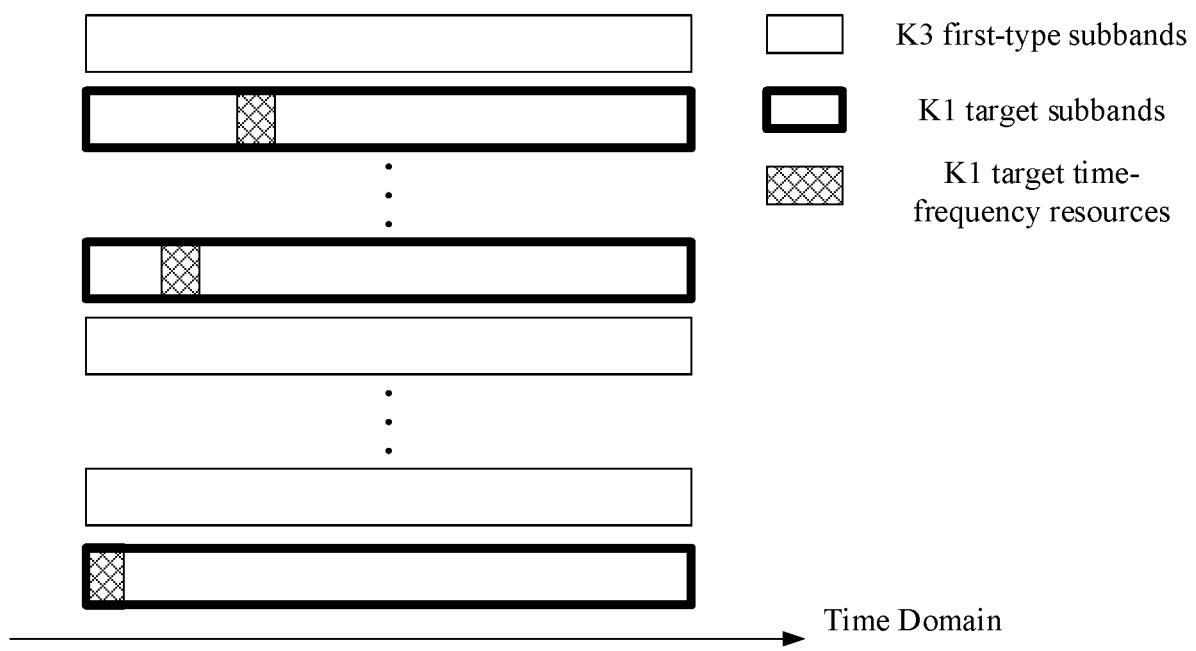
FIG. 7 is a diagram illustrating K1 target subbands according to one embodiment of the disclosure.

Embodiment 7 illustrates a diagram of K1 target subbands, as shown in FIG. 7. In FIG. 7, the K1 target subbands are one subset of the first-type subband set in the disclosure, and the first-type subband set includes K3 first-type subbands; the K1 target subbands include the K1 target time-frequency resources in the disclosure respectively; the K1 is a positive integer, and the K3 is a positive integer not less than the K1.

In one subembodiment, any two adjacent target subbands in frequency domain among the K1 target subbands are not continuous.

In one subembodiment, any one of the K1 target subbands occupies a positive integer number of consecutive PRBs in frequency domain and occupies T1 multicarrier symbol(s) in time domain, wherein the T1 is a positive integer.

In one affiliated embodiment of the above subembodiment, the T1 is a positive integer not greater than 3.

In one subembodiment, the K3 first-type subbands are indexed with 0, #1, . . . , #(K3−1) respectively.

In one subembodiment, the K3 first-type subbands are sequentially arranged in an order from low to high according to center frequency points.

In one subembodiment, the K3 first-type subbands are sequentially arranged in an order from low to high according to frequency points of lowest subcarriers.

In one subembodiment, the K3 first-type subbands are sequentially arranged in an order from low to high according to frequency points of highest subcarriers.

In one subembodiment, the K3 first-type subbands are sequentially arranged in an order appearing in a configuration signaling.

In one subembodiment, any one of the K3 first-type subbands does not belong to the second-type subband set in the disclosure.

In one subembodiment, at least one of the K3 first-type subbands does not belong to the second-type subband set in the disclosure.

Embodiment 8

Figure 8:
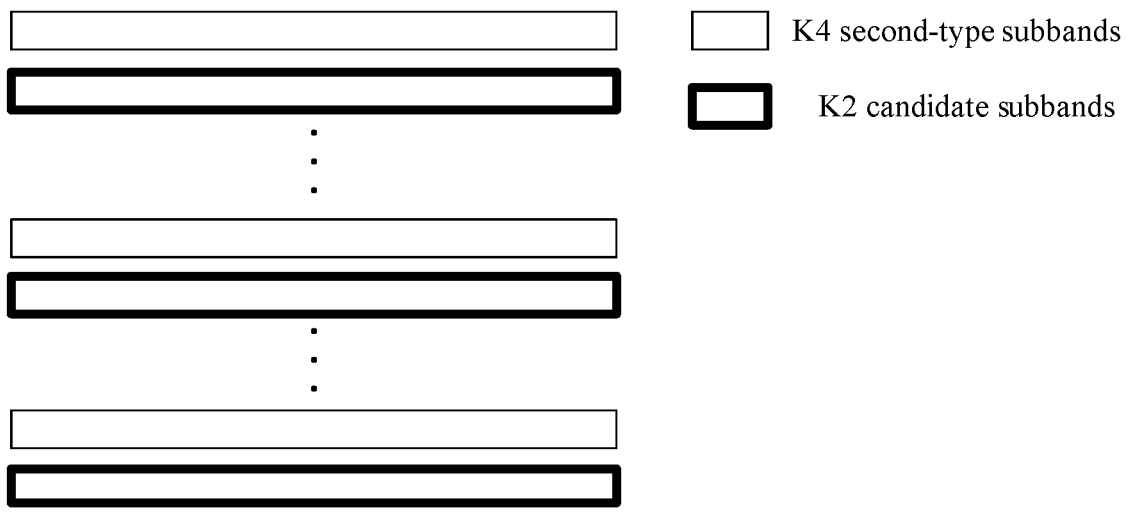
FIG. 8 is a diagram illustrating K2 candidate subbands according to one embodiment of the disclosure.

Embodiment 8 illustrates a diagram of K2 candidate subbands, as shown in FIG. 8. In FIG. 8, the K2 candidate subbands are one subset of the second-type subband set in the disclosure, and the second-type subband set includes K4 second-type subbands; the K2 is a positive integer, and the K4 is a positive integer not less than the K2.

In one subembodiment, any two adjacent candidate subbands in frequency domain among the K2 candidate subbands are not continuous.

In one subembodiment, the K4 second-type subbands are indexed with #0, #1, . . . , #(K4−1) respectively.

In one subembodiment, the K4 second-type subbands are sequentially arranged in an order from low to high according to center frequency points.

In one subembodiment, the K4 second-type subbands are sequentially arranged in an order from low to high according to frequency points of lowest subcarriers.

In one subembodiment, the K4 second-type subbands are sequentially arranged in an order from low to high according to frequency points of highest subcarriers.

In one subembodiment, the K4 second-type subbands are sequentially arranged in an order appearing in a configuration signaling.

In one subembodiment, any one of the K4 second-type subbands does not belong to the first-type subband set in the disclosure.

In one subembodiment, at least one of the K4 second-type subbands does not belong to the first-type subband set in the disclosure.

Embodiment 9

Figure 9:
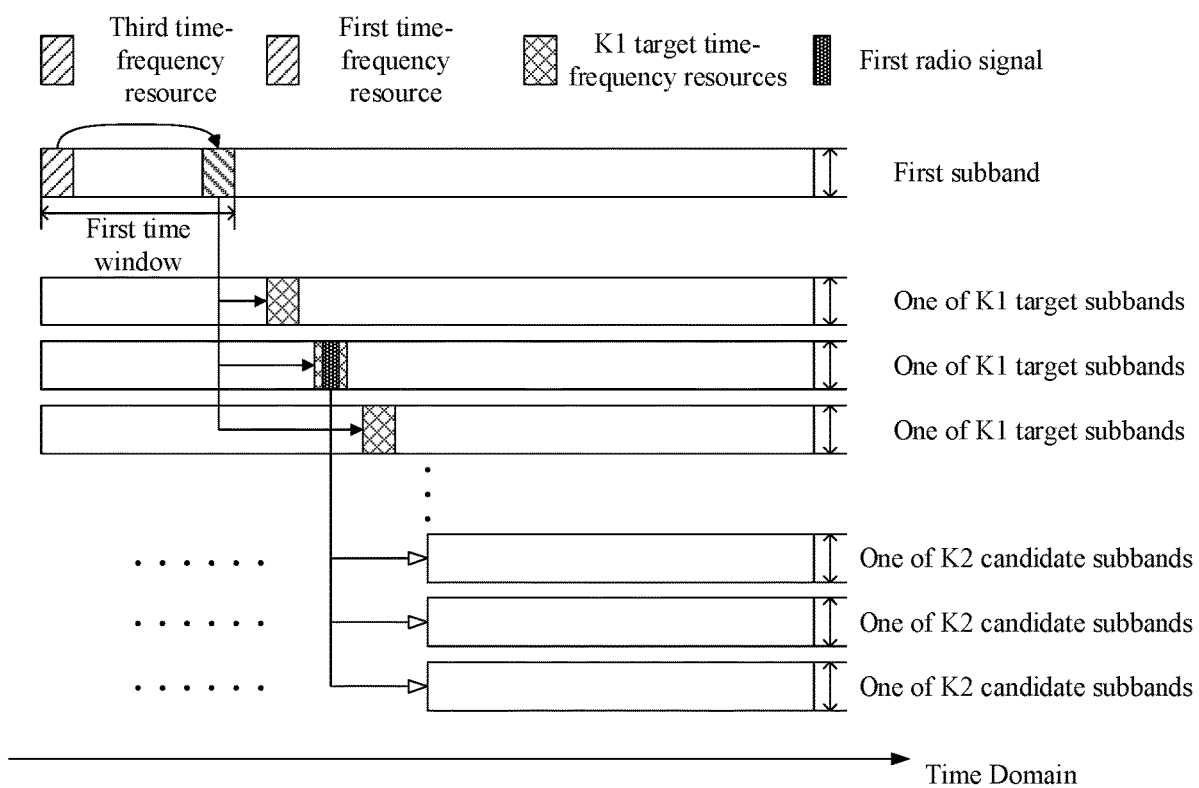
FIG. 9 is a diagram illustrating a relationship between a second signaling, a first signaling and a first radio signal according to one embodiment of the disclosure.

Embodiment 9 illustrates a diagram of a relationship between a second signaling, a first signaling and a first radio signal, as shown in FIG. 9. In FIG. 9, the first signaling is transmitted in a first time-frequency resource, the second signaling is transmitted in a third time-frequency resource, and the second signaling is used for indicating the first time-frequency resource; the first signaling is used for indicating the K1 target subbands, the K1 target subband(s) include(s) K1 target time-frequency resource(s) respectively, the first radio signal is transmitted in a second time-frequency resource, and the first radio signal is used for indicating K2 candidate subbands; time domain resources occupied by both the third time-frequency resource and the first time-frequency resource belong to a first time window; and the first radio signal is transmitted in one of the K1 target subbands.

In one subembodiment, the first time window is an MCOT for the first subband.

In one subembodiment, the K1 is equal to 1.

In one subembodiment, the K2 is a positive integer greater than 1.

In one subembodiment, for the K1 target subbands, the base station performs K1 LBTs respectively, and start times of the K1 LBTs are independent of each other.

In one subembodiment, for the K1 target subbands, the base station performs one given LBT only, and frequency domain resources specific to the given LBT include frequency domain resources occupied by the K1 target subbands.

In one subembodiment, for the K2 candidate subbands, the base station performs K2 LBTs respectively, and start times of the K2 LBTs are independent of each other.

In one subembodiment, for the K2 candidate subbands, the base station performs one given LBT only, and frequency domain resources specific to the given LBT include frequency domain resources occupied by the K2 candidate subbands.

Embodiment 10

Figure 10:
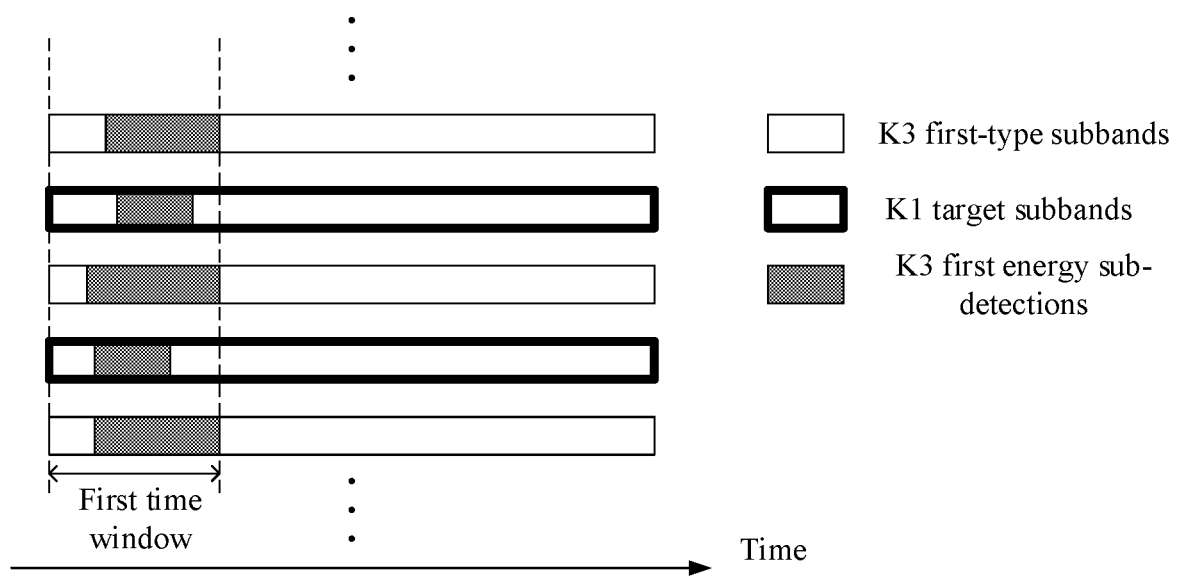
FIG. 10 is a diagram illustrating a first energy detection according to one embodiment of the disclosure.

Embodiment 10 illustrates a diagram of a first energy detection, as shown in FIG. 10. In FIG. 10, the first energy detection includes K3 first energy sub-detections, and the base station performs K3 first energy sub-detections for the K3 first-type subbands in the disclosure respectively; the base station determines through the K3 first energy sub-detections that K1 first-type subbands among the K3 first-type subbands are unoccupied, and the K1 first-type subbands are the K1 target subbands in the disclosure respectively.

In one subembodiment, the K3 first energy sub-detections are performed separately.

In one subembodiment, any one of the K3 first energy sub-detections has a start time in time domain not earlier than a start time of the first time window in the disclosure.

In one subembodiment, any one of the K3 first energy sub-detections has an end time in time domain not later than an end time of the first time window in the disclosure.

In one subembodiment, any one of the K3 first energy sub-detections is an energy detection.

Embodiment 11

Figure 11:
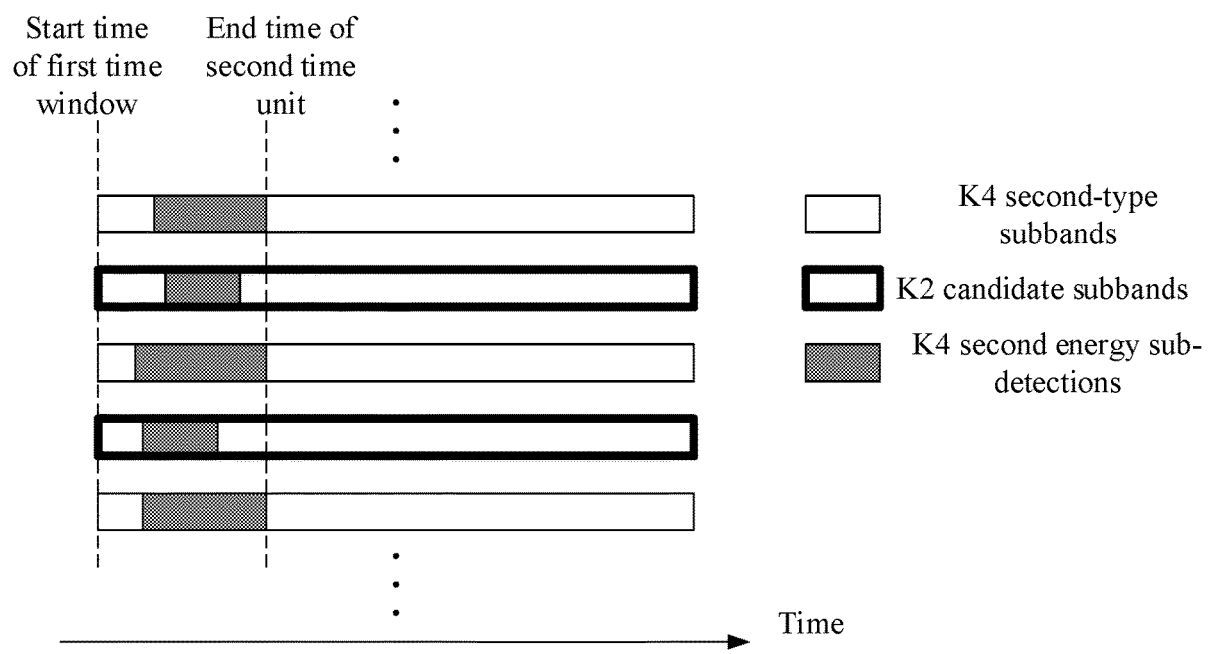
FIG. 11 is a diagram illustrating a second energy detection according to one embodiment of the disclosure.

Embodiment 11 illustrates a diagram of a second energy detection, as shown in FIG. 11. In FIG. 11, the second energy detection includes K4 second energy sub-detections, and the base station performs K4 second energy sub-detections for the K4 second-type subbands in the disclosure respectively; the base station determines through the K4 second energy sub-detections that K2 second-type subbands among the K4 second-type subbands are unoccupied, and the K2 second-type subbands are the K2 candidate subbands in the disclosure respectively.

In one subembodiment, the K4 second energy sub-detections are performed separately.

In one subembodiment, any one of the K4 second energy sub-detections has a start time in time domain not earlier than a start time of the first time window in the disclosure.

In one subembodiment, any one of the K4 second energy sub-detections has an end time in time domain not later than an end time of a second time unit, and time domain resources occupied by the second time-frequency resource in the disclosure are the second time unit.

In one subembodiment, any one of the K4 second energy sub-detections is an energy detection.

Embodiment 12

Figure 12:
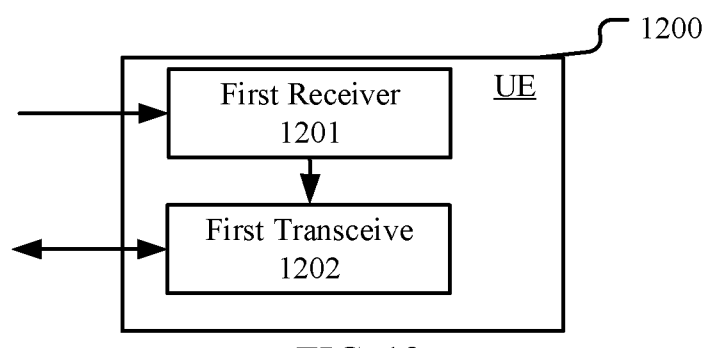
FIG. 12 is a structure block diagram illustrating a processing device in a UE according to one embodiment of the disclosure.

Embodiment 12 illustrates a structure block diagram of a processing device in a UE, as shown in FIG. 12. In FIG. 12, the processing device 1200 in the UE includes a first receiver 1201 and a first transceiver 1202.

The first receiver 1201 receives a first signaling in a first time-frequency resource.

The first transceiver 1202 receives a first radio signal in a second time-frequency resource.

In Embodiment 12, the first signaling is used for indicating K1 target subband(s), the K1 target subband(s) include(s) K1 target time-frequency resource(s) respectively, and the second time-frequency resource is one of the K1 target time-frequency resource(s); frequency domain resources occupied by the first time-frequency resource belong to a first subband, and any one of the K1 target subband(s) is orthogonal to the first subband; the first signaling is a physical layer signaling other than the UE-specific physical layer signalings; the first radio signal is a radio signal other than the UE-specific radio signals; time domain resources occupied by the first time-frequency resource are a first time unit, the first time unit belongs to a first time window, and a duration of the first time window in time domain is an MCOT for the first subband; and the K1 is a positive integer.

In one subembodiment, the first receiver 1201 also receives a second signaling in a third time-frequency resource; the second signaling is used for indicating the first time-frequency resource, and the second signaling is transmitted in the first subb and; and time domain resources occupied by the third time-frequency resource belong to the first time window.

In one subembodiment, the first transceiver 1202 receives a third signaling in a fourth time-frequency resource, and the first transceiver 1202 receives a fourth radio signal; frequency domain resources occupied by the fourth time-frequency resource belong to a fourth subband, and the fourth subband is one of K2 candidate subband(s); the first radio signal is used for determining the K2 candidate subband(s); the third signaling includes first configuration information, and the first configuration is applicable to the fourth radio signal; the first configuration information includes at least one of occupied frequency domain resources, occupied time domain resources, an MCS and a HARQ process number; and the K2 is a positive integer.

In one subembodiment, the first transceiver 1202 receives a third signaling in a fourth time-frequency resource, and the first transceiver 1202 transmits a fourth radio signal;

frequency domain resources occupied by the fourth time-frequency resource belong to a fourth subband, and the fourth subband is one of K2 candidate subband(s); the first radio signal is used for determining the K2 candidate subband(s); the third signaling includes first configuration information, and the first configuration is applicable to the fourth radio signal; the first configuration information includes at least one of occupied frequency domain resources, occupied time domain resources, an MCS and a HARQ process number; and the K2 is a positive integer.

In one subembodiment, a first identifier is the UE specific, and the first identifier is used for determining the fourth subband from the K2 candidate subband(s).

In one subembodiment, the first receiver 1201 also receives first information; the first information is used for indicating a first-type subband set, and the first-type subband set includes the first subband and the K1 target subband(s); and the first information is transmitted through an air interface.

In one subembodiment, the first receiver 1201 also receives second information, the second information is used for indicating a second-type subband set, and the second-type subband set includes the K2 candidate subband(s); and the second information is transmitted through an air interface.

In one subembodiment, the first receiver 1201 also receives a first-type information group; the first-type information group is used for configuring the first subband and a second subband; frequency domain resources occupied by the second time-frequency resource belong to the second subband; and the first-type information group includes at least one of relevant information to a subcarrier spacing, relevant information to a cyclic prefix or relevant information to a bandwidth.

In one subembodiment, the first receiver 1201 includes at least the former two of the receiver 456, the receiving processor 452 or the controller/processor 490 illustrated in Embodiment 4.

In one subembodiment, the first transceiver 1202 includes at least the former four of the transmitter/receiver 456, the transmitting processor 455, the receiving processor 452 or the controller/processor 490 illustrated in Embodiment 4.

Embodiment 13

Figure 13:
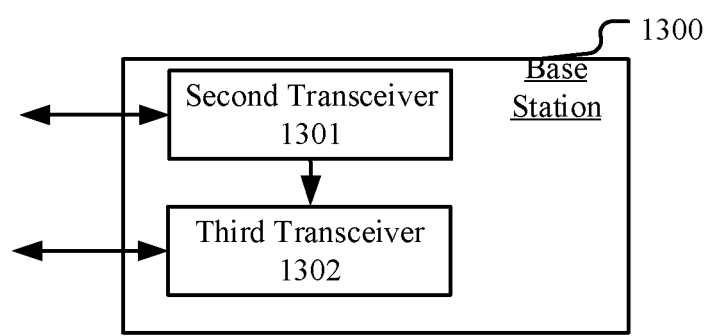
FIG. 13 is a structure block diagram illustrating a processing device in a base station according to one embodiment of the disclosure.

Embodiment 13 illustrates a structure block diagram of a processing device in a base station, as shown in FIG. 13. In FIG. 13, the processing device 1300 in the base station includes a second transceiver 1301 and a third transceiver 1302.

The second transceiver 1301 transmits a first signaling in a first time-frequency resource.

The third transceiver 1302 transmits a first radio signal in a second time-frequency resource.

In Embodiment 13, the first signaling is used for indicating K1 target subband(s), the K1 target subband(s) include(s) K1 target time-frequency resource(s) respectively, and the second time-frequency resource is one of the K1 target time-frequency resource(s); frequency domain resources occupied by the first time-frequency resource belong to a first subband, and any one of the K1 target subband(s) is orthogonal to the first subband; a receiver of the first signaling includes a first terminal, and the first signaling is a physical layer signaling other than the first terminal-specific physical layer signalings; the first radio signal is a radio signal other than the first terminal-specific radio signals; time domain resources occupied by the first time-frequency resource are a first time unit, the first time unit belongs to a first time window, and a duration of the first time window in time domain is an MCOT for the first subband; and the K1 is a positive integer.

In one subembodiment, the second transceiver 1301 also transmits a second signaling in a third time-frequency resource; the second signaling is used for indicating the first time-frequency resource, and the second signaling is transmitted in the first subband; and time domain resources occupied by the third time-frequency resource belong to the first time window.

In one subembodiment, the third transceiver 1302 also transmits a third signaling in a fourth time-frequency resource, and the third transceiver 1302 also transmits a fourth radio signal; frequency domain resources occupied by the fourth time-frequency resource belong to a fourth subband, and the fourth subband is one of K2 candidate subband(s); the first radio signal is used for determining the K2 candidate subband(s); the third signaling includes first configuration information, and the first configuration is applicable to the fourth radio signal; the first configuration information includes at least one of occupied frequency domain resources, occupied time domain resources, an MCS and a HARQ process number; and the K2 is a positive integer.

In one subembodiment, the third transceiver 1302 also transmits a third signaling in a fourth time-frequency resource, and the third transceiver 1302 also receives a fourth radio signal; frequency domain resources occupied by the fourth time-frequency resource belong to a fourth subband, and the fourth subband is one of K2 candidate subband(s); the first radio signal is used for determining the K2 candidate subband(s); the third signaling includes first configuration information, and the first configuration is applicable to the fourth radio signal; the first configuration information includes at least one of occupied frequency domain resources, occupied time domain resources, an MCS and a HARQ process number; and the K2 is a positive integer.

In one subembodiment, a first identifier is the first terminal specific, and the first identifier is used for determining the fourth subband from the K2 candidate subband(s).

In one subembodiment, the second transceiver 1301 also transmits first information; the first information is used for indicating a first-type subband set, and the first-type subband set includes the first subband and the K1 target subband(s); the first information is transmitted through an air interface.

In one subembodiment, the second transceiver 1301 also performs a first energy detection on K3 first-type subband(s); and the first energy detection is used for determining the K1 target subband(s) from the K3 first-type subband(s), and the first-type subband set includes the K3 first-type subband(s).

In one subembodiment, the second transceiver 1301 also transmits second information; the second information is used for indicating a second-type subband set, and the second-type subband set includes the K2 candidate subband(s); and the second information is transmitted through an air interface.

In one subembodiment, the second transceiver 1301 also performs a second energy detection on K4 second-type subband(s); and the second energy detection is used for determining the K2 candidate subband(s) from the K4 second-type subband(s), and the second-type subband set includes the K4 second-type subband(s).

In one subembodiment, the second transceiver 1301 also transmits a first-type information group; the first-type information group is used for configuring the first subband and a second subband; frequency domain resources occupied by the second time-frequency resource belong to the second subband; and the first-type information group includes at least one of relevant information to a subcarrier spacing, relevant information to a cyclic prefix or relevant information to a bandwidth.

In one subembodiment, the second transceiver 1301 includes at least the former four of the receiver/transmitter 416, the transmitting processor 415, the receiving processor 412 or the controller/processor 440 illustrated in Embodiment 4.

In one subembodiment, the third transceiver 1302 includes at least the former four of the receiver/transmitter 416, the transmitting processor 415, the receiving processor 412 or the controller/processor 440 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and the terminal in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station in the disclosure includes but not limited to macro-cellular base stations, micro-cellular base stations, home base stations, relay base station, gNBs (NR nodes B), Transmitter Receiver Points (TRPs), and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising:

receiving a first signaling in a first time-frequency resource; and receiving a first radio signal in a second time-frequency resource;

receiving a third signaling in a fourth time-frequency resource; and operating a fourth radio signal;

wherein the first signaling is used for indicating K1 target subband(s), the K1 target subband(s) comprise(s) K1 target time-frequency resource(s) respectively, and the second time-frequency resource is one of the K1 target time-frequency resource(s); frequency domain resources occupied by the first time-frequency resource belong to a first subband, and any one of the K1 target subband(s) is orthogonal to the first subband; the first signaling is a physical layer signaling other than the UE-specific physical layer signalings; the first radio signal is a radio signal other than the UE-specific radio signals; time domain resources occupied by the first time-frequency resource are a first time unit, the first time unit belongs to a first time window, and a duration of the first time window in time domain is a Max Channel Occupy Time (MCOT) for the first subband; and the K1 is a positive integer; frequency domain resources occupied by the fourth time-frequency resource belong to a fourth subband, and the fourth subband is one of K2 candidate subband(s); the first radio signal is used for determining the K2 candidate subband(s); the third signaling comprises first configuration information, and the first configuration is applicable to the fourth radio signal; the first configuration information comprises at least one of occupied frequency domain resources, occupied time domain resources, a Modulation and Coding State (MCS) and a HARQ process number; the operating is receiving or the operating is transmitting; and the K2 is a positive integer.

2. The method according to claim 1, comprising:

receiving a second signaling in a third time-frequency resource;

wherein the second signaling is used for indicating the first time-frequency resource, and the second signaling is transmitted in the first subband; and time domain resources occupied by the third time-frequency resource belong to the first time window.

3. The method according to claim 1, wherein a first identifier is the UE specific, and the first identifier is used for determining the fourth subband from the K2 candidate subband(s);

or, comprising:

receiving second information;

wherein the second information is used for indicating a second-type subband set, and the second-type subband set comprises the K2 candidate subband(s); and the second information is transmitted through an air interface.

4. The method according to claim 1, comprising:

receiving first information;

wherein the first information is used for indicating a first-type subband set, and the first-type subband set comprises the first subband and the K1 target subband(s); and the first information is transmitted through an air interface;

or, comprising:

receiving a first-type information group;

wherein the first-type information group is used for configuring the first subband and a second subband; frequency domain resources occupied by the second time-frequency resource belong to the second subband; and the first-type information group comprises at least one of relevant information to a subcarrier spacing, relevant information to a cyclic prefix or relevant information to a bandwidth.

5. A method in a base station for wireless communication, comprising:
    transmitting a first signaling in a first time-frequency resource; and
    transmitting a first radio signal in a second time-frequency resource;
    transmitting a third signaling in a fourth time-frequency resource; and
    processing a fourth radio signal;
    wherein the first signaling is used for indicating K1 target subband(s), the K1 target subband(s) comprise(s) K1 target time-frequency resource(s) respectively, and the second time-frequency resource is one of the K1 target time-frequency resource(s); frequency domain resources occupied by the first time-frequency resource belong to a first subband, and any one of the K1 target subband(s) is orthogonal to the first subband; a receiver of the first signaling comprises a first terminal, and the first signaling is a physical layer signaling other than the first terminal-specific physical layer signalings; the first radio signal is a radio signal other than the first terminal-specific radio signals; time domain resources occupied by the first time-frequency resource are a first time unit, the first time unit belongs to a first time window, and a duration of the first time window in time domain is an MCOT for the first subband; and the K1 is a positive integer; frequency domain resources occupied by the fourth time-frequency resource belong to a fourth subband, and the fourth subband is one of K2 candidate subband(s); the first radio signal is used for determining the K2 candidate subband(s); the third signaling comprises first configuration information, and the first configuration is applicable to the fourth radio signal; the first configuration information comprises at least one of occupied frequency domain resources, occupied time domain resources, an MCS and a HARQ process number; the processing is transmitting or the processing is receiving; and the K2 is a positive integer.

6. The method according to claim 5, comprising:
    transmitting a second signaling in a third time-frequency resource;
    wherein the second signaling is used for indicating the first time-frequency resource, and the second signaling is transmitted in the first subband; and time domain resources occupied by the third time-frequency resource belong to the first time window.

7. The method according to claim 5, wherein a first identifier is the first terminal specific, and the first identifier is used for determining the fourth subband from the K2 candidate subband(s);
    or, comprising:
    transmitting second information, and performing a second energy detection on K4 second-type subband(s);
    wherein the second information is used for indicating a second-type subband set, and the second-type subband set comprises the K2 candidate subband(s); the second information is transmitted through an air interface; and the second energy detection is used for determining the K2 candidate subband(s) from the K4 second-type subband(s), and the second-type subband set comprises the K4 second-type subband(s).

8. The method according to claim 5, comprising:
    transmitting first information, and performing a first energy detection on K3 first-type subband(s);
    wherein the first information is used for indicating a first-type subband set, and the first-type subband set comprises the first subband and the K1 target subband(s); the first information is transmitted through an air interface; and the first energy detection is used for determining the K1 target subband(s) from the K3 first-type subband(s), and the first-type subband set comprises the K3 first-type subband(s);
    or, comprising:
    transmitting a first-type information group;
    wherein the first-type information group is used for configuring the first subband and a second subband; frequency domain resources occupied by the second time-frequency resource belong to the second subband; and the first-type information group comprises at least one of relevant information to a subcarrier spacing, relevant information to a cyclic prefix or relevant information to a bandwidth.

9. A UE for wireless communication, comprising:
    a first receiver, to receive a first signaling in a first time-frequency resource; and
    a first transceiver, to receive a first radio signal in a second time-frequency resource, to receive a third signaling in a fourth time-frequency resource, and to operate a fourth radio signal;
    wherein the first signaling is used for indicating K1 target subband(s), the K1 target subband(s) comprise(s) K1 target time-frequency resource(s) respectively, and the second time-frequency resource is one of the K1 target time-frequency resource(s); frequency domain resources occupied by the first time-frequency resource belong to a first subband, and any one of the K1 target subband(s) is orthogonal to the first subband; the first signaling is a physical layer signaling other than the UE-specific physical layer signalings; the first radio signal is a radio signal other than the UE-specific radio signals; time domain resources occupied by the first time-frequency resource are a first time unit, the first time unit belongs to a first time window, and a duration of the first time window in time domain is an MCOT for the first subband; and the K1 is a positive integer; frequency domain resources occupied by the fourth time-frequency resource belong to a fourth subband, and the fourth subband is one of K2 candidate subband(s); the first radio signal is used for determining the K2 candidate subband(s); the third signaling comprises first configuration information, and the first configuration is applicable to the fourth radio signal; the first configuration information comprises at least one of occupied frequency domain resources, occupied time domain resources, an MCS and a HARQ process number; the operate is receive or the operate is transmit and the K2 is a positive integer.

10. The UE according to claim 9, wherein the first receiver receives a second signaling in a third time-frequency resource; the second signaling is used for indicating the first time-frequency resource, and the second signaling is transmitted in the first subband; and time domain resources occupied by the third time-frequency resource belong to the first time window.

11. The UE according to claim 9, wherein a first identifier is the UE specific, and the first identifier is used for determining the fourth subband from the K2 candidate subband(s);

or, the first receiver receives second information, the second information is used for indicating a second-type subband set, and the second-type subband set comprises the K2 candidate subband(s); and the second information is transmitted through an air interface.

12. The UE according to claim 9, wherein the first receiver receives first information; the first information is used for indicating a first-type subband set, and the first-type subband set comprises the first subband and the K1 target subband(s); and the first information is transmitted through an air interface;

or, the first receiver receives a first-type information group; the first-type information group is used for configuring the first subband and a second subband; frequency domain resources occupied by the second time-frequency resource belong to the second subband; and the first-type information group comprises at least one of relevant information to a subcarrier spacing, relevant information to a cyclic prefix or relevant information to a bandwidth.

13. A base station for wireless communication, comprising:
a second transceiver, to transmit a first signaling in a first time-frequency resource; and
a third transceiver, to transmit a first radio signal in a second time-frequency resource, to transmit a third signaling in a fourth time-frequency resource, and to process a fourth radio signal;
wherein the first signaling is used for indicating K1 target subband(s), the K1 target subband(s) comprise(s) K1 target time-frequency resource(s) respectively, and the second time-frequency resource is one of the K1 target time-frequency resource(s); frequency domain resources occupied by the first time-frequency resource belong to a first subband, and any one of the K1 target subband(s) is orthogonal to the first subband; a receiver of the first signaling comprises a first terminal, and the first signaling is a physical layer signaling other than the first terminal-specific physical layer signalings; the first radio signal is a radio signal other than the first terminal-specific radio signals; time domain resources occupied by the first time-frequency resource are a first time unit, the first time unit belongs to a first time window, and a duration of the first time window in time domain is an MCOT for the first subband; and the K1 is a positive integer; frequency domain resources occupied by the fourth time-frequency resource belong to a fourth subband, and the fourth subband is one of K2 candidate subband(s); the first radio signal is used for determining the K2 candidate subband(s); the third signaling comprises first configuration information, and the first configuration is applicable to the fourth radio signal; the first configuration information comprises at least one of occupied frequency domain resources, occupied time domain resources, an MCS and a HARQ process number; the process is transmit or the process is receive; and the K2 is a positive integer.

14. The base station according to claim 13, wherein the second transceiver transmits a second signaling in a third time-frequency resource; the second signaling is used for indicating the first time-frequency resource, and the second signaling is transmitted in the first subband; and time domain resources occupied by the third time-frequency resource belong to the first time window.

15. The base station according to claim 13, wherein a first identifier is the first terminal specific, and the first identifier is used for determining the fourth subband from the K2 candidate subband(s);

or, the second transceiver transmits second information, and the second transceiver performs a second energy detection on K4 second-type subband(s); the second information is used for indicating a second-type subband set, and the second-type subband set comprises the K2 candidate subband(s); the second information is transmitted through an air interface; and the second energy detection is used for determining the K2 candidate subband(s) from the K4 second-type subband(s), and the second-type subband set comprises the K4 second-type subband(s).

16. The base station according to claim 13, wherein the second transceiver transmits first information, and the second transceiver performs a first energy detection on K3 first-type subband(s); the first information is used for indicating a first-type subband set, and the first-type subband set comprises the first subband and the K1 target subband(s); the first information is transmitted through an air interface; and the first energy detection is used for determining the K1 target subband(s) from the K3 first-type subband(s), and the first-type subband set comprises the K3 first-type subband(s);

or, the second transceiver transmits a first-type information group; the first-type information group is used for configuring the first subband and a second subband; frequency domain resources occupied by the second time-frequency resource belong to the second subband; and the first-type information group comprises at least one of relevant information to a subcarrier spacing, relevant information to a cyclic prefix or relevant information to a bandwidth.

* * * * *